(12) United States Patent
Sakuramata et al.

(10) Patent No.: US 8,516,363 B2
(45) Date of Patent: Aug. 20, 2013

(54) IMAGE PROCESSING APPARATUS, COMPUTER PROGRAM PRODUCT, AND PREVIEW IMAGE DISPLAYING METHOD

(75) Inventors: Yoshifumi Sakuramata, Tokyo (JP); Tetsuya Sakayori, Tokyo (JP); Takashi Yano, Tokyo (JP); Junichi Takami, Kanagawa (JP); Hiroko Mano, Tokyo (JP); Takanori Nagahara, Kanagawa (JP); Iwao Saeki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1227 days.

(21) Appl. No.: 12/044,472

(22) Filed: Mar. 7, 2008

(65) Prior Publication Data

US 2008/0218816 A1  Sep. 11, 2008

(30) Foreign Application Priority Data

Mar. 8, 2007 (JP) .................. 2007-058635

(51) Int. Cl.
 *G06F 17/24* (2006.01)
 *G06F 17/25* (2006.01)
(52) U.S. Cl.
 USPC ........... 715/243; 715/244; 715/246; 715/247; 715/251; 715/252; 715/253; 715/273; 715/274
(58) Field of Classification Search
 USPC ................. 715/243, 244, 246, 247, 251–253, 715/273, 274
 See application file for complete search history.

(56) References Cited

U.S. PATENT DOCUMENTS

| | | | | |
|---|---|---|---|---|
| 5,768,488 | A * | 6/1998 | Stone et al. | 358/1.18 |
| 6,067,554 | A * | 5/2000 | Hohensee et al. | 715/209 |
| 6,243,549 | B1 * | 6/2001 | Ando | 399/85 |
| 6,919,967 | B1 * | 7/2005 | Pentecost et al. | 358/1.15 |
| 7,177,045 | B2 * | 2/2007 | Goel et al. | 358/1.18 |
| 7,194,696 | B2 * | 3/2007 | Mori | 715/783 |
| 7,856,146 | B2 * | 12/2010 | Itoh et al. | 382/192 |
| 2004/0263907 | A1 * | 12/2004 | Hiraki | 358/1.18 |
| 2006/0250630 | A1 * | 11/2006 | Mori | 358/1.13 |
| 2007/0091372 | A1 * | 4/2007 | Matsuki | 358/1.18 |

FOREIGN PATENT DOCUMENTS

| | | |
|---|---|---|
| JP | 2001-67347 | 3/2001 |
| JP | 2003-11459 | 1/2003 |
| JP | 2006-3568 | 1/2006 |

* cited by examiner

*Primary Examiner* — Stephen Hong
*Assistant Examiner* — Wilson Tsui
(74) *Attorney, Agent, or Firm* — Dickstein Shapiro LLP

(57) ABSTRACT

In an image processing apparatus, a plurality of images and a page allocation area including a plurality of sections are displayed. The allocation unit determines which one of the images is to be allocated to which one of the sections and allocates the images to the sections, and a preview image generating unit generates a preview image of the page allocation area based on allocation made by the allocation unit, and displays the preview image on the screen.

20 Claims, 18 Drawing Sheets

FIG.4

| SETTING ITEMS | POSITION (UPPER LEFT, LOWER RIGHT COORDINATES) |
|---|---|
| STAPLE | (0, 0) (40, 40) |
| | (120, 0) (160, 40) |
| PUNCH | (0, 40) (40, 270) |
| | (40, 0) (200, 40) |
| ADJUST MARGIN | |

IMAGE PROCESSING APPARATUS, COMPUTER PROGRAM PRODUCT, AND PREVIEW IMAGE DISPLAYING METHOD

CROSS-REFERENCE TO RELATED APPLICATIONS

The present application claims priority to and incorporates by reference the entire contents of Japanese priority document 2007-058635 filed in Japan on Mar. 8, 2007.

BACKGROUND OF THE INVENTION

1. Field of the Invention

The present invention relates to an image processing apparatus, a computer program product, and a preview image displaying method.

2. Description of the Related Art

A multi-function product, which is a so-called multi-function peripheral (MFP), has recently become widely used. An MFP includes a scanning unit that scans an image of an original, a copying unit that prints out an image read by the scanning unit, a printing unit or a facsimile unit that prints out image data that has been input externally, or provided with functions of the foregoing units.

With such an MFP, a user can enter settings for various functions. These functions include: settings relating to conditions of an original, such as a type or density thereof; settings relating to various imaging processes, such as an enlargement/reduction ratio, one-sided or double-sided printing, or margin sizes; and settings relating to finishing processes, such as stamping, stapling, or punching.

However, even if the user specifies settings for these finishing functions, known MFPs do not allow the user to check how a resultant printout will be until the resultant printout is actually output. For example, if the user attempts to punch holes on the printout, the holes may end up being punched on an output image. However, because the user cannot check such an end result before executing the actual printing, the operation may result in a misprint, and the paper may be wasted.

Japanese Patent Application Laid-open No. 2001-67347 discloses an image processing apparatus developed in an attempt to solve this problem. The image processing apparatus displays a preview image of end results of various functions (such as a printing paper size, a printed side(s) thereof, punching, or stapling) provided using a pre-scanned image of an original before executing actual printing. This preview feature allows the user to check how the output result will be, and to change the settings if necessary.

The applicant of the present application has developed an intuitive and convenient user interface in Japanese Patent Application Laid-open No. 2006-003568. This interface enables the user to touch a specific area of the preview image of an original to cause a menu related to that area to be displayed, and to select functions related thereto (such as a printing paper, a printed side(s), punching, stapling, output color, output density, enlargement/reduction ratio, printing multiple pages per sheet, and sorting/stacking), and the selected settings are immediately reflected onto the preview image.

The preview image is especially useful for "multiple-pages-per-sheet printing" among these functions whose settings are reflected onto the preview image. The "multiple-pages-per-sheet printing" is a function that enables a plurality of pages to be printed on a single sheet. Therefore, the user can check how the pages will be allocated within a sheet on the preview image.

However, the preview images according to the Japanese Patent Application Laid-open No. 2001-67347 and Japanese Patent Application Laid-open No. 2006-003568 permit allocation of the pages only in one direction. Because the pages can be allocated only in one direction, it could be a problem if the pages that are to be printed on a single sheet need to be allocated in different directions. Examples of this situation include when vertically written originals and horizontally written originals are mixed or originals are not the same size.

SUMMARY OF THE INVENTION

It is an object of the present invention to at least partially solve the problems in the conventional technology.

According to an aspect of the present invention, there is provided an image processing apparatus including a screen displaying unit that displays a screen that includes an image display area for displaying a plurality of images, and a page allocation area including a plurality of sections; an allocation unit that determines which one of the images displayed in the image display area is to be allocated to which one of the sections of the page allocation area, and allocates the images to the sections; and a preview image generating unit that generates a preview image of the page allocation area based on allocation made by the allocation unit, and displays the preview image on the screen.

According to another aspect of the present invention, there is provided a preview image displaying method including displaying a screen that includes an image display area for displaying a plurality of images, and a page allocation area including a plurality of sections; determining which one of the images displayed in the image display area is to be allocated to which one of the sections of the page allocation area, and allocating the images to the sections; and generating a preview image of the page allocation area based on allocation made by the allocation unit, and displaying the preview image on the screen.

According to still another aspect of the present invention, there is provided a computer program product including a computer usable medium having computer readable program codes embodied in the medium that, when executed, causes an image processing apparatus to execute the above preview image displaying method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a table showing relation between a setting item and a settable area;

DETAILED DESCRIPTION OF THE PREFERRED EMBODIMENTS

Exemplary embodiments of the present invention are explained in detail below with reference to the accompanying drawings.

First Embodiment

A first embodiment of the present invention is explained with reference to FIGS. 1 to 12. In the first embodiment, a multifunction peripheral (MFP), including functions such as copying facsimile, printing, scanning, and distributing, is used as the image processing apparatus. The distributing function is a function that distributes an input image (such as an image of an original scanned by the scanning function, or an image input via the printing or the facsimile function).

Figure 1:
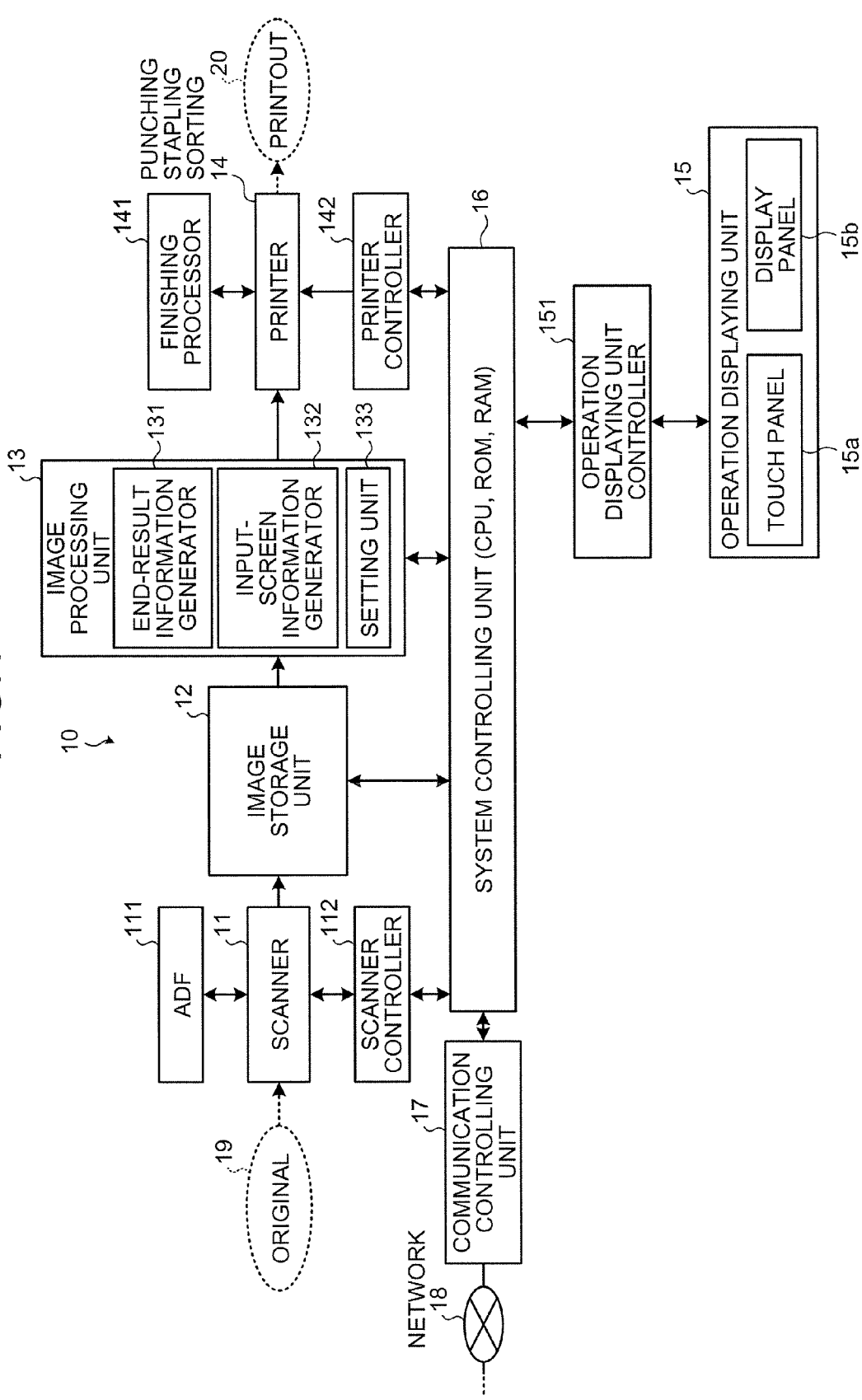
FIG. 1 is a functional block diagram of a MFP according to a first embodiment of the present invention.

FIG. 1 is a functional block diagram of an MFP 10 according to the first embodiment. The MFP 10 includes a scanner 11, an auto document feeder (ADF) 111, a scanner controller 112, an image storage unit 12, an image processing unit 13, a printer 14, a printer controller 142, a finishing processor 141, an operation displaying unit 15, an operation displaying unit 151, a system controlling unit 16, and a communication controlling unit 17. The MFP 10 is connected to a network 18 via the communication controlling unit 17. The MFP 10 scans an image of an original 19, performs imaging processes thereto, and outputs the image as a printout 20.

The system controlling unit 16 is connected to each of the above-described components, and controls the entire MFP 10. One example of the controls performed by the system controlling unit 16 is to provide the scanner 11 with information indicative of a scanning area suitable for a selected paper size. The system controlling unit 16 includes a central processing unit (CPU), a read-only memory (ROM), and a random access memory (RAM), each of which is not shown. The CPU operates according to computer programs that are stored in the ROM, using a working area in the RAM, to execute various functions.

The computer programs executed in the MFP 10 can be stored in a computer-readable storage medium, such as a compact disc-read only memory (CD-ROM), a flexible disk (FD), a compact disc-recordable (CD-R), or a digital versatile disk (DVD) as files in an installable or an executable format. If the computer programs are stored in such a storage medium, the CPU in the system controlling unit 16 reads and loads the computer programs from the storage medium onto a main storage device (not shown), to realize the various functions of the MFP 10. The computer programs can be stored in another computer connected to the network 18, such as an Internet, and downloaded over the network 18. Alternatively, the computer programs can be provided or distributed via a network, such as the Internet.

The communication controlling unit 17 is connected to the network 18, such as a local area network (LAN) or the Internet, and exchanges image data and control data with other apparatus connected to the network, following communication protocols.

The scanner controller 112 receives instructions from the system controlling unit 16 to control the scanner 11. The scanner 11 is controlled by the scanner controller 112 to convert an image of the original 19 to digital image data. The ADF 111 can feed a plurality of originals to a scanning position of the scanner 11 one by one, so that the scanner 11 can automatically scan the originals continuously. The ADF 111 can reverse both an original with an image printed on one side and an original with images printed on both sides, and sends them to the scanner 11. Therefore, the scanner 11 can scan images printed on both sides of an original.

The image storage unit 12 is a buffer memory that receives an instruction from the system controlling unit 16 to temporarily store therein image data scanned by the scanner 11, image data externally input via the network 18, or the like. The MFP 10 is capable of processing and providing an image forming process to either the image data scanned by the scanner 11, or the image data that is externally input, for example, via the network 18.

The image processing unit 13 receives an instruction from the system controlling unit 16 to provide a γ correction, a modulation transfer function (MTF) correction, or the like, and then to provide gradation processes, such as slicing or dithering to binarize (or multi-value) multi-valued data sent from the scanner 11 and stored temporarily in the image storage unit 12. In addition to the above, the image processing unit 13 performs various image processes (such as enlargement/reduction of an image, adjustment of density/colors of an image) for the functions set by a user. Furthermore, the image processing unit 13 performs an image area editing process (such as removing, moving, and reversing an image area), a layout process (such as double-sided/single-sided printing, multiple-pages-per-sheet printing, and margin adjustment), and an end-result information generating process for generating a preview image of the resultant printout.

The image processing unit 13 includes an end-result information generator 131, an input-screen information generator 132, and a setting unit 133. The end-result information generator 131 basically functions to generate the end result information (preview images) to be displayed on a display panel 15b. The end result information is generated by providing various processes and settings to the image data of a pre-scanned original, based on the various settings input for that image data. The end-result information generator 131 uses the multi-valued data temporarily stored in the image storage unit 12. The input-screen information generator 132 generates information about an input screen to be displayed on the display panel 15b. The information includes setting items for accepting therethrough various settings relating to the end result information generated by the end-result information generator 131.

If a user enters settings via an input screen 400 that is displayed on the display panel 15b, using a touch panel 15a, the setting unit 133 not only accepts the input signals, but also obtains coordinate information in the input image stored in the image storage unit 12.

When the setting unit 133 accepts the input setting signals, the end-result information generator 131 generates updated end result information again based on the input setting signals accepted by the setting unit 133, and an expected end result image, updated by the updated end result information, is displayed on the display panel 15b.

The input-screen information generator 132 generates input screen information for generating a screen for accepting settings input by the user, again, based on the input setting signals accepted by the setting unit 133. The input screen 400 is then updated based on the input screen information generated by the input-screen information generator 132, and displayed on the display panel 15b.

The printer controller 142 receives an instruction from the system controlling unit 16 to control the printer 14. The printer 14 includes the finishing processor 141. The finishing processor 141 accepts automatic settings or settings by the user to perform finishing processes such as sorting, stamping, stapling, or punching. Sorting is a process to sort the printouts 20 into sets or units of pages after printing is completed. Stamping is a process to provide a given stamp to a printed medium. Stapling is a process to align a plurality of printed media and to staple together. Punching is a process to punch holes so that the printed media can be filed in a binder or a file.

The operation displaying unit controller 151 functions as a displaying unit, and controls inputs and outputs to/from the operation displaying unit 15 in response to the instructions received from the system controlling unit 16. For example, the operation displaying unit controller 151 controls to output data processed in the image processing unit 13 therefrom to the touch panel 15a and the display panel 15b that are provided to the operation displaying unit 15. More specifically, the operation displaying unit controller 151 causes the generated end result information (preview image) to be displayed on the display panel 15b, and controls inputs entered by the user via the touch panel 15a. The display panel 15b and the touch panel 15a are shown to be separate units in FIG. 1. However, they are integrated in the first embodiment.

The touch panel 15a electrically or magnetically detects a position of a pointer in contact therewith. A human finger, a stylus pen, and other contact-type input instruments (hereinafter, "pointer") can be used as a pointing unit (not shown) for the touch panel 15a. The user enters various settings, including those for the printing, by touching the touch panel 15a using one of these pointers.

In the first embodiment, the settings are explained to be input by the user touching the touch panel 15a, however, it is not limited to such an inputting method. For example, instead of the touch panel 15a, the operation displaying unit 15 can include hardware keys to allow the user to input the settings by pushing the physical keys to provide instructions, such as a print instruction. Moreover, the MFP 10 can include the display panel 15b as a dedicated displaying unit.

Under the control of the operation displaying unit controller 151, the operation displaying unit 15 accepts the settings input by the user via the touch panel 15a, and displays the end result information (preview image) or menu items in a setting area for setting finishing processes on the display panel 15b as a displaying unit.

The operation displaying unit 15 displays functions that the user wishes to execute with the MFP 10 as menu items in the setting screen. The user can enter settings through these menu items, and the operation displaying unit 15 accepts the settings entered by the user. When the user touches the touch panel 15a with a pointer in a section where a menu item can be selected, the operation displaying unit controller 151 detects coordinates of the touched point. If the operation displaying unit controller 151 detects that the touched point is within an area where a given menu item can be selected, then the operation displaying unit controller 151 assumes that the menu item has been selected, and accepts the input for the menu item. The operation displaying unit 15 accepts settings, such as: condition settings for scanning a specific original with the scanner 11; settings for the image processing unit 13 for performing processes such as image quality adjustment of the scanned image data; printing condition settings for the printer 14; or settings for the finishing processor 141 for performing finishing processes such as sorting, stapling, or punching, to the printouts after printing is completed.

The system controlling unit 16 receives various settings such as those described above via the operation displaying unit controller 151, and causes the image processing unit 13 to process the original image data that is stored in the image storage unit 12 based on the specified settings, and to generate end result information (preview image). The end result information (preview image) is sent to the operation displaying unit 15, and displayed on the display panel 15b.

Figure 2:
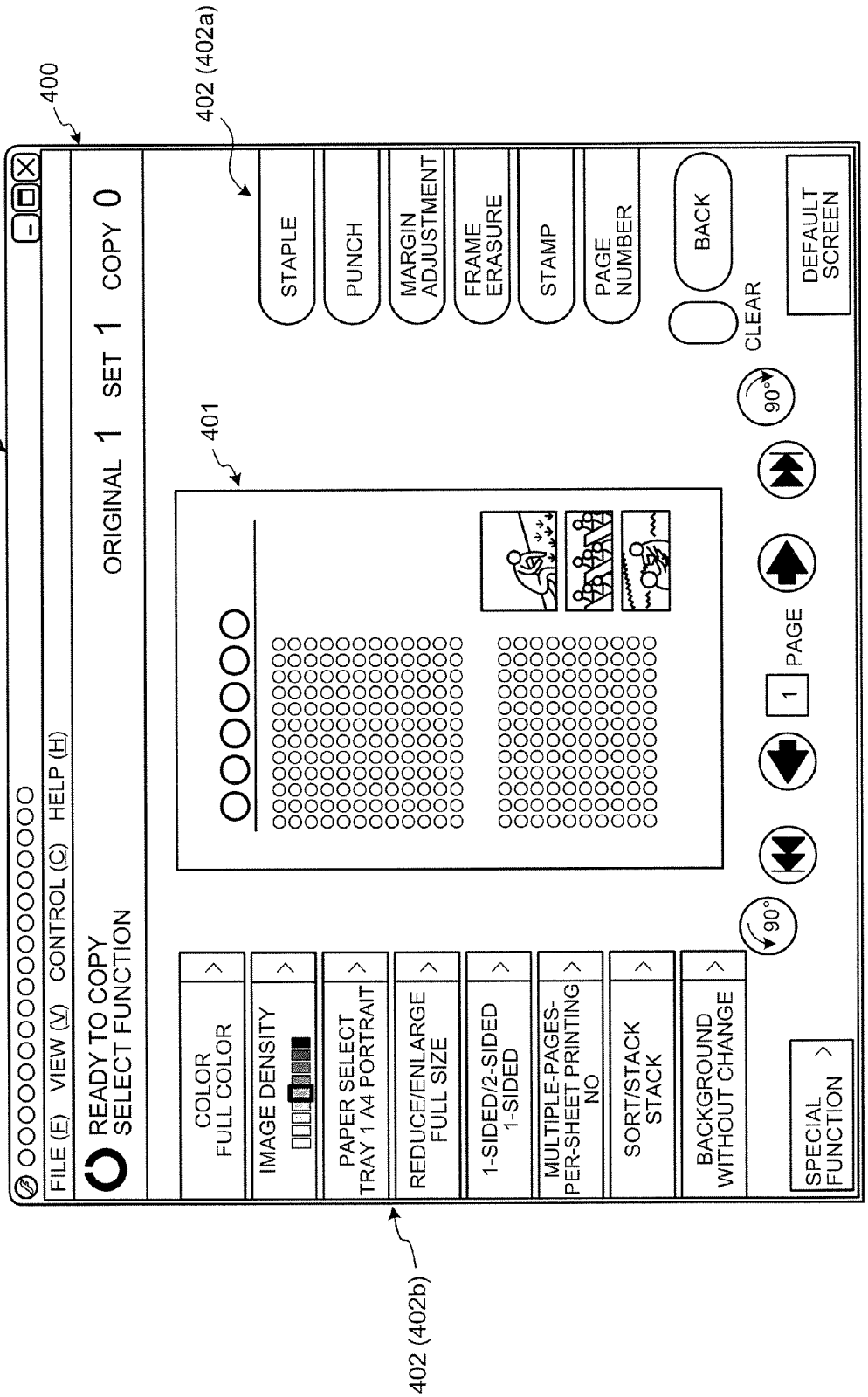
FIG. 2 is a schematic diagram of an example of end result information (preview image)

FIG. 2 is a schematic diagram of an example of end result information (preview image) generated when image data is input to the MFP 10. The display panel 15b in the operation displaying unit 15 displays end result information (preview image) 401 and setting menu items 402. The setting menu items 402 include those for a menu 402a and a menu 402b. The menu 402a is displayed on the right side of the screen, and includes position-dependent setting menu items that are dependent on positions in the end result information (preview image) 401. Examples of the position-dependent setting menu items include finishing processes, such as stapling, punching, adjusting binding margins, erasing a frame, stamping, or assigning page numbers. The menu 402b is displayed on the left side of the display, and includes setting menu items that are not dependent on content, such as output color, output density, paper size, enlargement/reduction ratio, double-sided/single-sided printing, multiple-pages-per-sheet printing, sorting/stacking, or background.

The user touches the touch panel 15a with the pointer while looking at the end result information (preview image) 401 displayed on the display panel 15b. The touch panel 15a accepts the touch made by the pointer as an input of position information, which is a spatial position of the resultant printout on the end result information (preview image) 401. The setting unit 133 analyzes the position information accepted by the touch panel 15a, and obtains coordinate information of the position that the pointer touched on the image.

With such structure, the MFP 10 can display the end result information (preview image) 401 on the display panel 15b provided to the operation displaying unit 15 of the MFP 10 before actually printing a copy. Therefore, the user can visually check the end result information (preview image) and change the settings, if necessary, before executing the actual printing.

Figure 3:
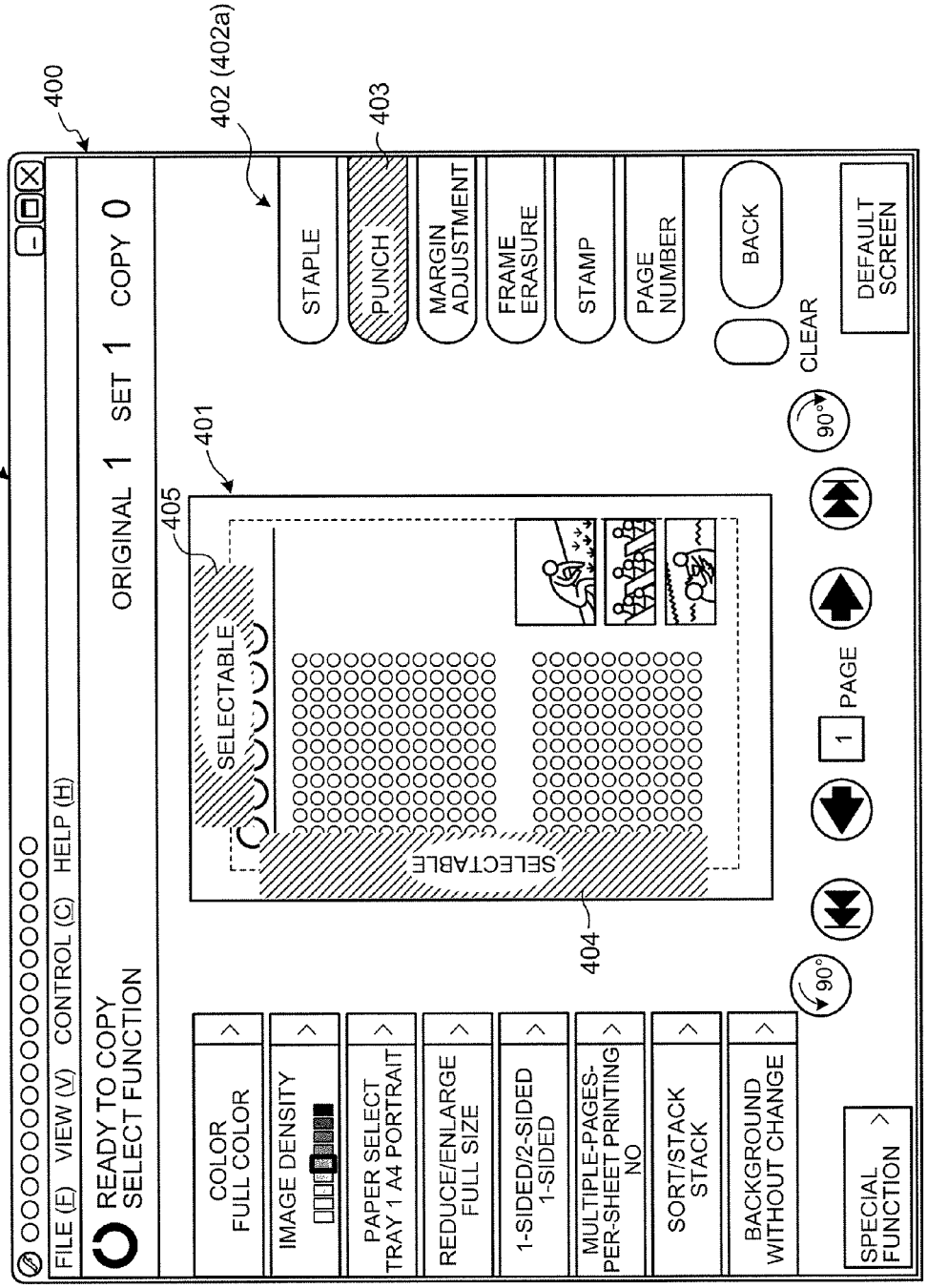
FIG. 3 is a schematic diagram of the example end result information shown in FIG. 2 after a setting menu item has been selected.

As shown in FIG. 3, it is assumed that the user selects a punching operation 403 from the setting menu items 402 (402a), displayed on the operation displaying unit 15, by touching it.

The operation displaying unit 15 detects the input for the punching operation 403, and the system controlling unit 16 accepts the setting of the punching operation 403 via the operation displaying unit controller 151. The input-screen information generator 132 in the image processing unit 13 obtains settable areas 404 and 405, corresponding to the "punching", from a table shown in FIG. 4 in which each of the setting menu items 402 and its settable positions are associated with each other, and displays the settable areas 404 and 405 on the operation displaying unit 15. The settable areas 404 and 405, where the holes can be punched, may be displayed in the end result information (preview image) 401 in any manner. For example, the settable areas 404 and 405 can be displayed so that they are superposed on the end result information 401 or they are overwritten on the end result information 401. Alternatively, the settable areas 404 and 405 can be provided with a color different from that of the end result information 401, blinked, or the area except the settable areas 404 and 405 can be darkened. The settable positions in the table shown in FIG. 4 are defined as two coordinate points defining a diagonal. The diagonal connecting these two coordinate points defines a rectangle having one side parallel to a main scanning direction and the other side parallel to a sub-scanning direction. For example, the settable areas for the "stapling" operation are defined by coordinates (0, 0) and (40, 40), and (120, 0) and (160, 40).

Figure 5:
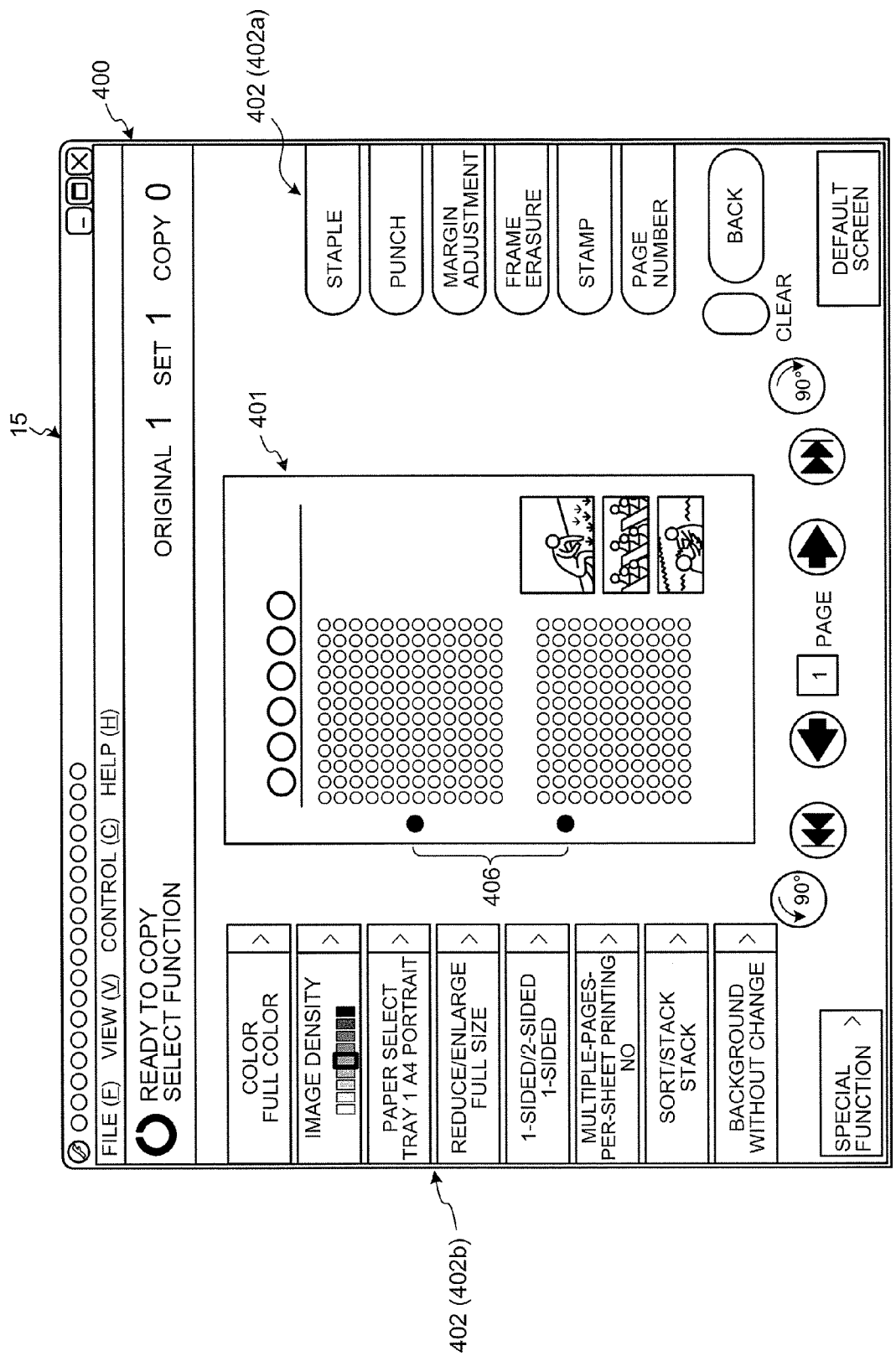
FIG. 5 is a schematic diagram of an example of the end result information shown in FIG. 3 with holes punched.

The user selects and touches the settable area 404 as shown in FIG. 3 with the pointer. When the operation displaying unit 15 accepts the input by way of the pointer touching the settable area 404 for the punching operation 403, the end-result information generator 131 in the image processing unit 13 generates end result information (preview image) with holes punched in the accepted area, and sends the information to the operation displaying unit 15. In response, the information is displayed on the operation displaying unit 15. FIG. 5 is a schematic diagram of the end result information (preview image) 401 with holes 406 punched. The end result information (preview image) 401, displayed in the process described above, can accept further inputs for settings, for example, to make corrections. The accepted settings are reflected to the end result information (preview image) 401 again, and displayed on the operation displaying unit 15. If no further setting inputs are accepted, a print instruction is accepted.

The configuration can be such that when the user touches a specific area (not shown) in the preview image, menu items relating to the area are displayed. When the user selects one of the menu items, the selection can be immediately reflected to the preview image.

Figure 6:
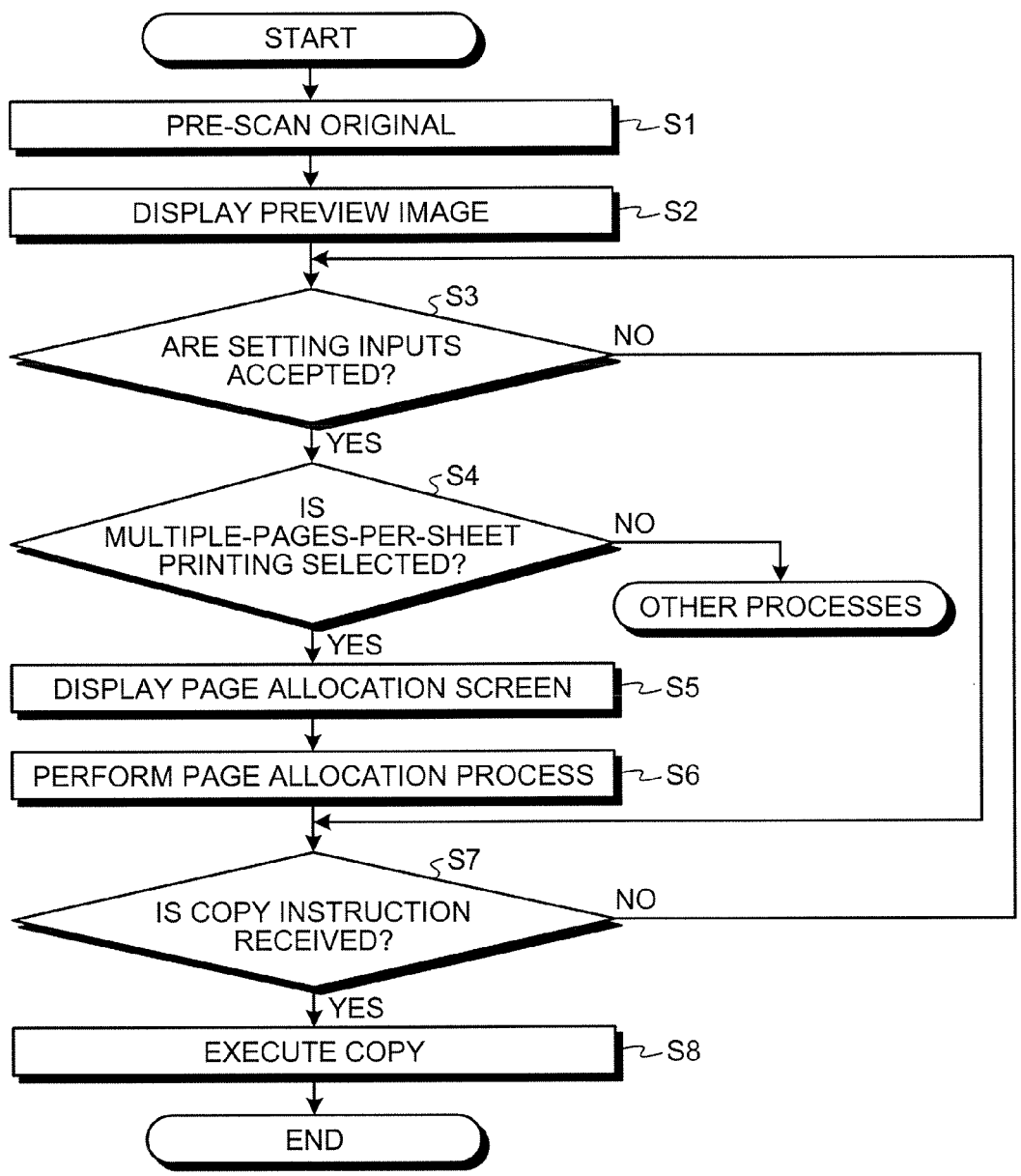
FIG. 6 is a flowchart of a preview image displaying process according to the first embodiment, executed when multiple-pages-per-sheet printing is selected.

With reference to a flowchart shown in FIG. 6, a preview image displaying process is explained when a user selects the multiple-pages-per-sheet printing, which is a characterizing operation realized by the CPU of the system controlling unit 16 operating based on a computer program stored in the ROM.

In the preview image displaying process for the multiple-pages-per-sheet printing shown in FIG. 6, the originals 19 with a plurality of pages are set in the ADF 111 in the scanner 11, and pre-scanned (step S1). The scanned images of the originals 19 are displayed on the input screen 400 as the end result information (preview image) 401 (step S2).

Figure 7:
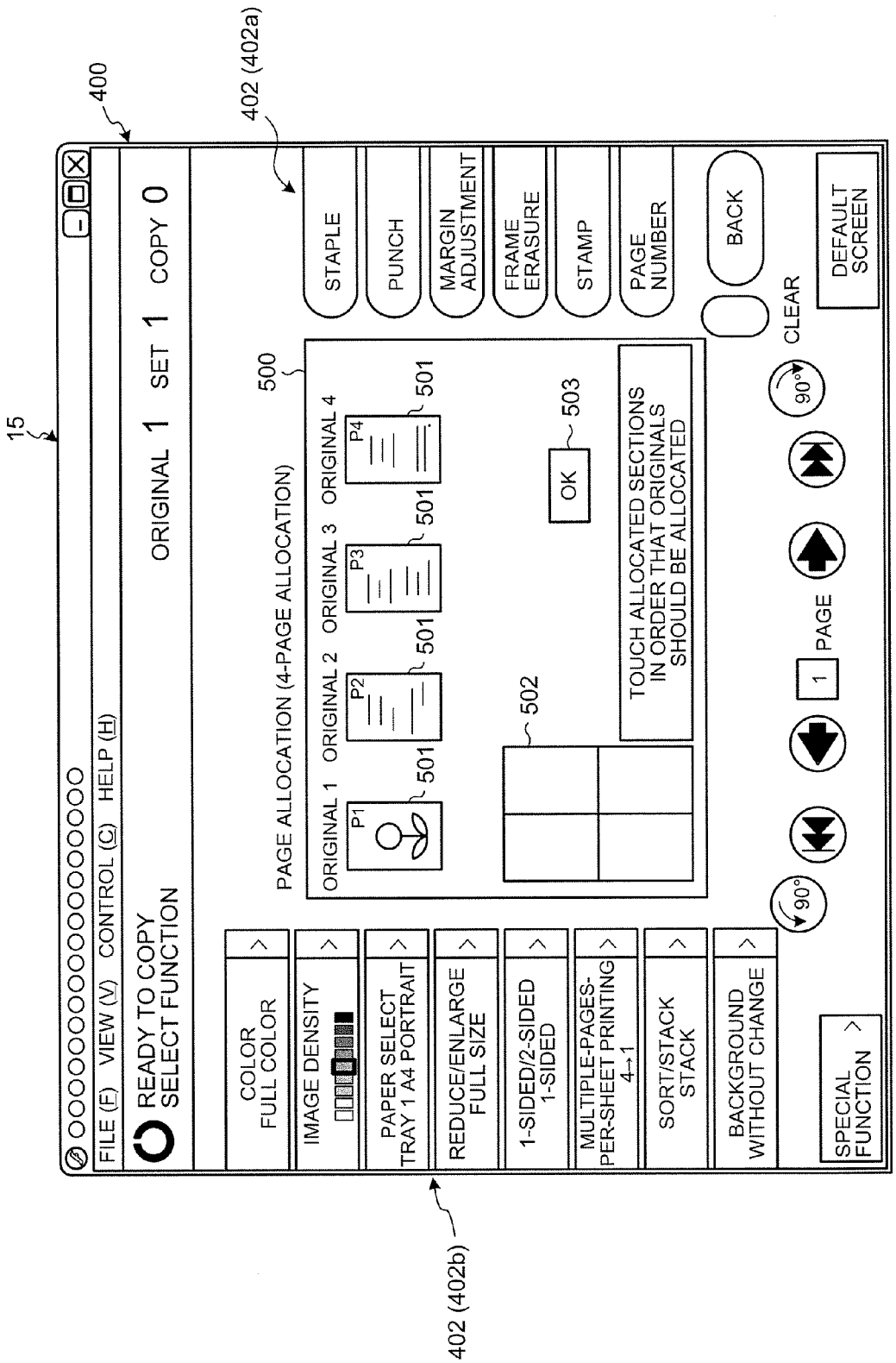
FIG. 7 is a schematic diagram of an exemplary screen used to allocate images into a single sheet according to the first embodiment.
Figure 8:
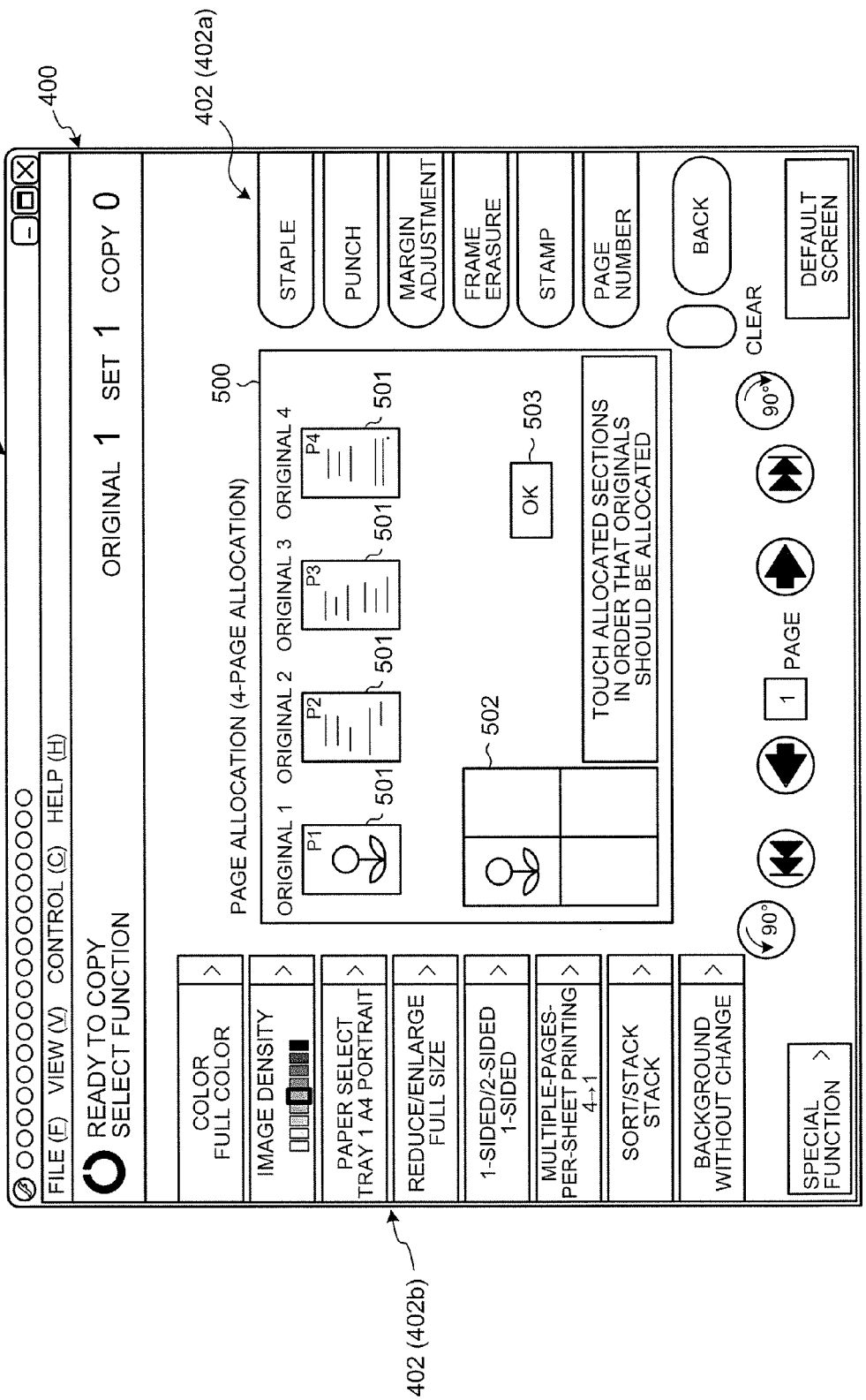
FIG. 8 is a schematic diagram of another exemplary screen used to allocate images into a single sheet according to the first embodiment.
Figure 9:
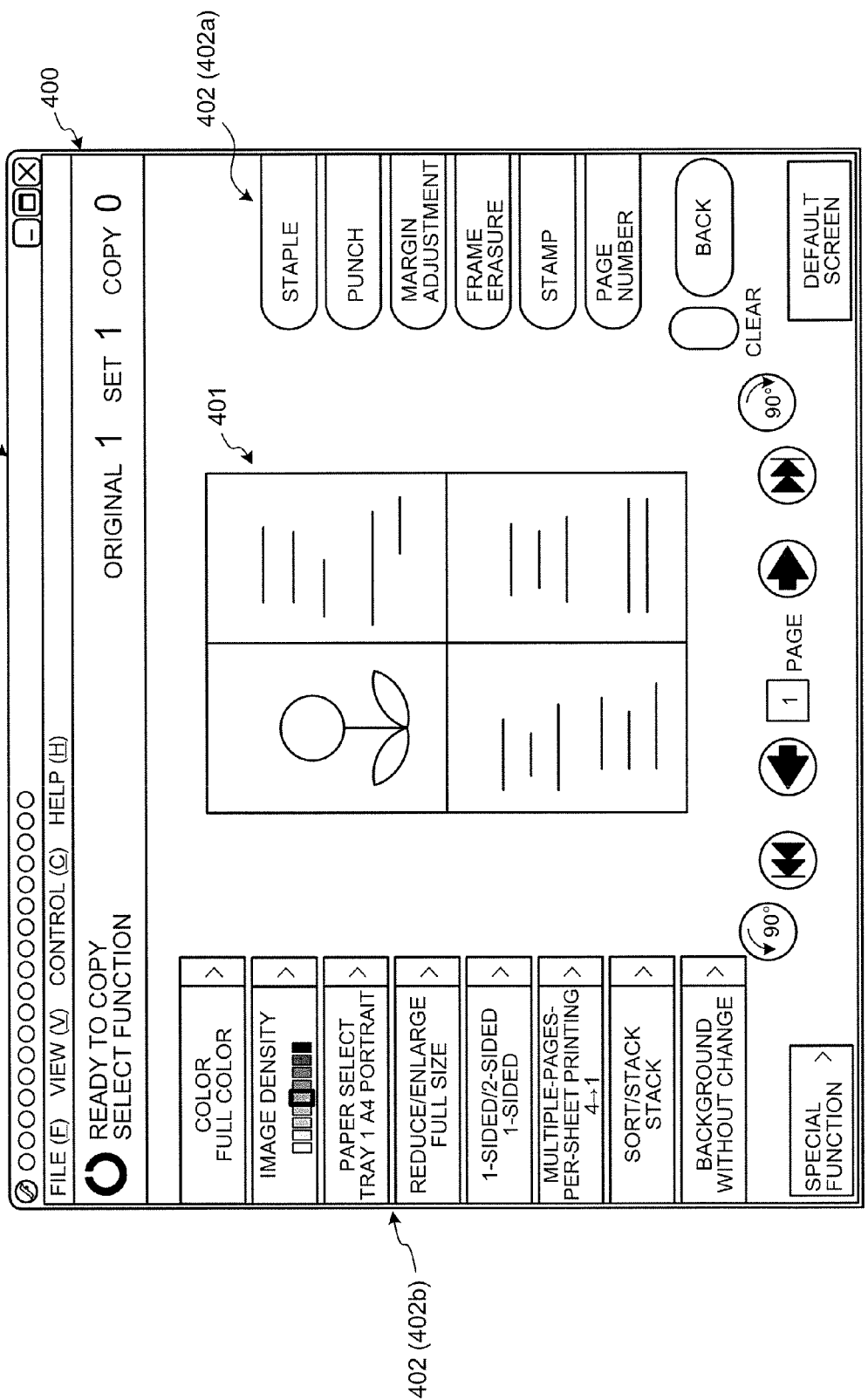
FIG. 9 is a schematic diagram of another example of the end result information according to the first embodiment.

When the user selects a multiple-pages-per-sheet printing 407 from the setting menu items 402 (402b) displayed on the operation displaying unit 15 by way of touching it (YES at step S3, YES at step S4), the system controlling unit 16 sends the input screen 400, including a page allocation window 500 as shown in FIG. 7, to the operation displaying unit 15. In response, the operation displaying unit 15 displays the input screen 400 (step S5), and the page allocation process is performed (step S6). More specifically, the system controlling unit 16 controls the input-screen information generator 132 to generate input screen information for displaying the page allocation window 500, and sends the information to the operation displaying unit 15. In response, the operation displaying unit 15 displays the information. As shown in FIG. 7, the page allocation window 500 is displayed in the input screen 400. The page allocation window 500 includes an original image(s) 501 with one or more pages, and a page allocation sheet (a preview image with multiple pages allocated) 502. In this manner, the input screen 400 functions as a screen displaying unit. In FIG. 7, the multiple-pages-per-sheet printing is selected to print four pages in one sheet, and the page allocation window 500 allows the user to directly specify which of the original images 501 is allocated to which section of the page allocation sheet 502. Specifically, the original images 501 are allocated to the sections of the page allocation sheet 502 in the order the user touches (specifies) the section of the page allocation sheet 502. In this manner, an allocation accepting unit is realized. FIG. 8 is a schematic diagram of an example of allocation when the upper left section of the page allocation sheet 502 is touched first. Therefore, in FIG. 8, the first page of the original image 501 is allocated to the upper left section of the page allocation sheet 502. The user can change the allocation of the original images 501 to the page allocation sheet 502 by sequentially touching two of the allocated sections in the page allocation sheet 502. The allocation is ended when the user pushes an "OK" button 503 in the page allocation window 500. When the "OK" button 503 is pushed, the end result information (preview image) 401 obtained by the process according to the multiple-pages-per-sheet printing is displayed on the operation displaying unit 15 as shown in FIG. 9 in the same manner as in FIG. 2. The system controlling unit 16 then waits for detailed settings. In this manner, a preview image generating unit is realized.

The operation displaying unit 15 waits to detect a copy instruction, by a copy button being pushed, for example. Upon accepting the copy instruction (NO at step S3, YES at step S7), the image data is copied based on the end result information (preview image) 401 with various settings input for the image data (step S8).

According to the present embodiment, when the multiple-pages-per-sheet processing item is selected from the setting menu items to print multiple images in a single sheet, the image processing apparatus displays input screen information having the page allocation window that includes a plurality of images and the page allocation sheet to which each of the images is allocated. The image processing apparatus then accepts a selection as to which section of the page allocation sheet each of the images is to be allocated, and generates a preview image with the images allocated to a single sheet based on the page allocation sheet to which the images are allocated. Therefore, the images can be allocated to a single sheet according to an instruction by the user to be displayed as the preview image when the multiple-pages-per-sheet print is selected.

The allocation of the images at the step S6 is not limited to the one described above, where each of the original images 501 are allocated to each section of the page allocation sheet 502 in the order the user touches the section, and various alternatives are still possible. Some modifications of allocation of the original images 501 to the page allocation sheet 502 are explained.

Figure 10:
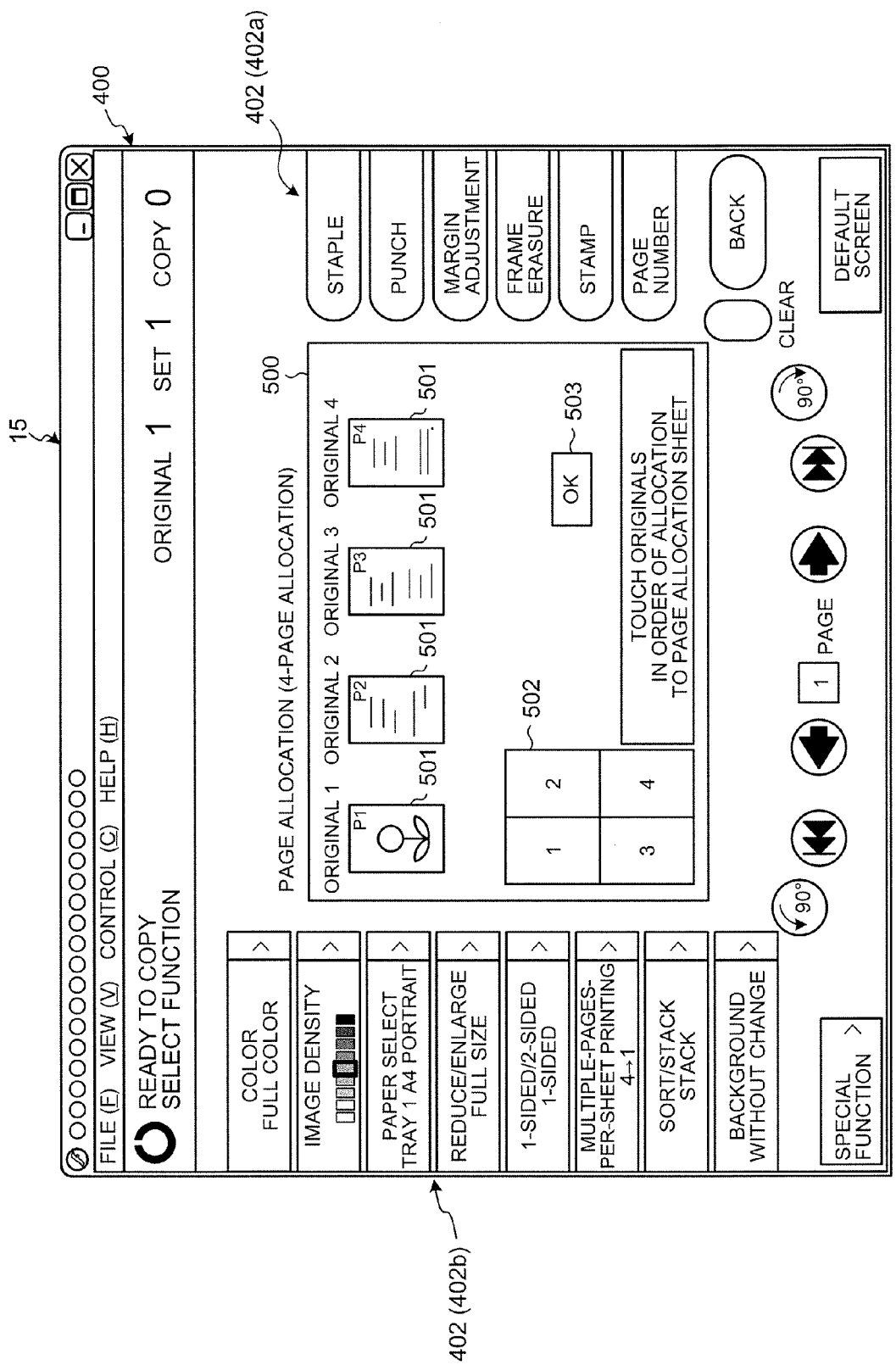
FIG. 10 is a schematic diagram of a screen used to allocate images into a single sheet according to a first modification of the first embodiment.

FIG. 10 is a schematic diagram of the input screen 400 according to a first modification of the first embodiment. As shown in FIG. 10, the input screen 400 displays the page allocation window 500. The page allocation window 500 includes the original images 501, in the number same as the number of pages to be printed in a sheet, and the page allocation sheet 502 having pre-assigned numbers. This arrangement allows the user to allocate the original images 501 by touching the original images 501 in the order of the pre-assigned number in the page allocation sheet 502. In this manner, the user can specify the allocation of the images by simply touching the images.

Figure 11:
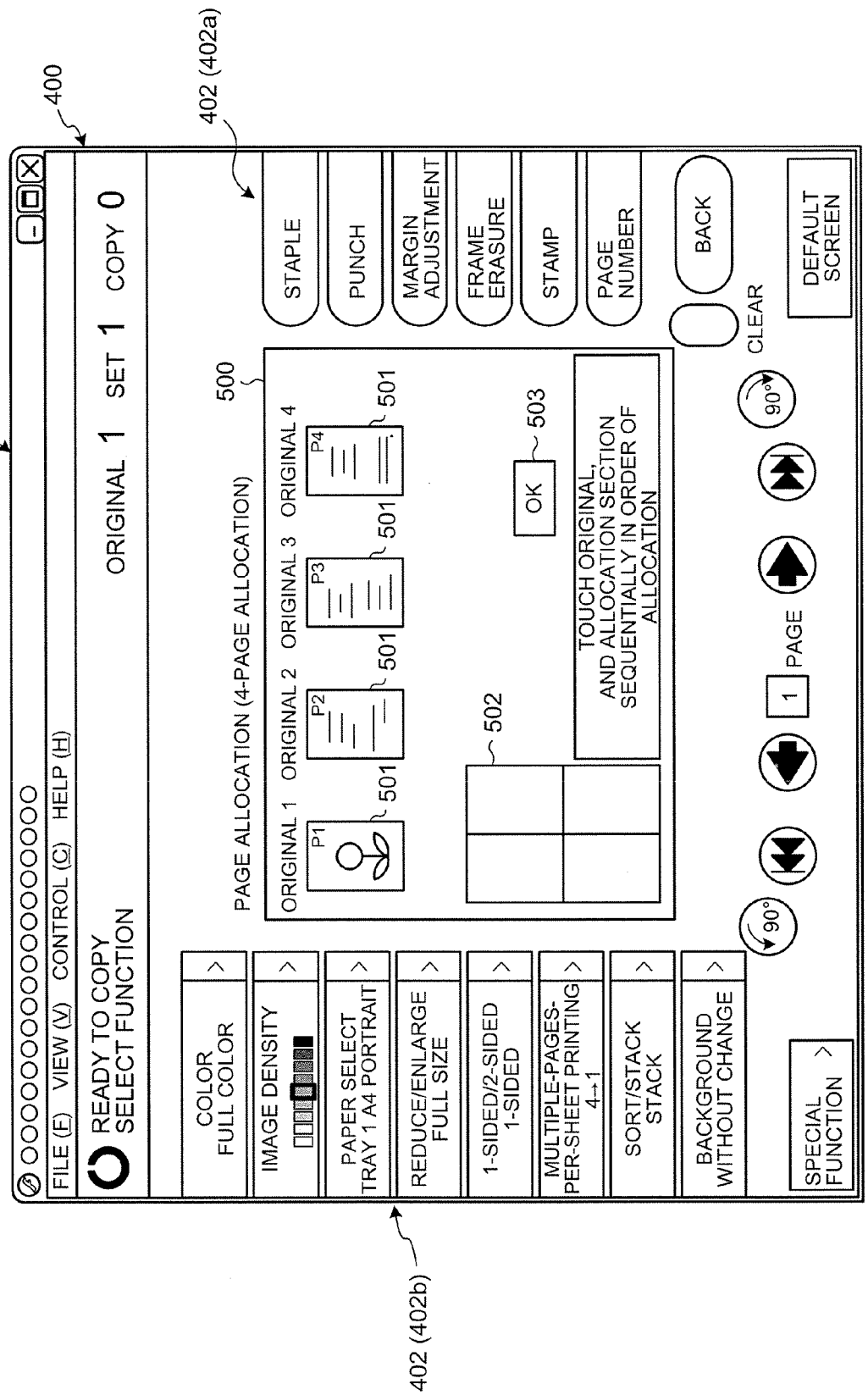
FIG. 11 is a schematic diagram of a screen used to allocate images into a single sheet according to a second modification of the first embodiment.

FIG. 11 is a schematic diagram of the input screen 400 according to a second modification of the first embodiment. As shown in FIG. 11, the input screen 400 displays the page allocation window 500. The page allocation window 500 includes the original images 501, in the number same as the number of pages to be printed in a sheet, and the page allocation sheet 502. This arrangement allows the user to allocate each of the original images 501 to a desired section of the page allocation sheet 502 by touching one of the original images 501 and then one of the sections of the page allocation sheet 502, one after another, alternately. In this manner, the original image 501 touched first is allocated to the section of the page allocation sheet 502 touched next. Therefore, the user can allocate the original images 501 more intuitively.

Figure 12:
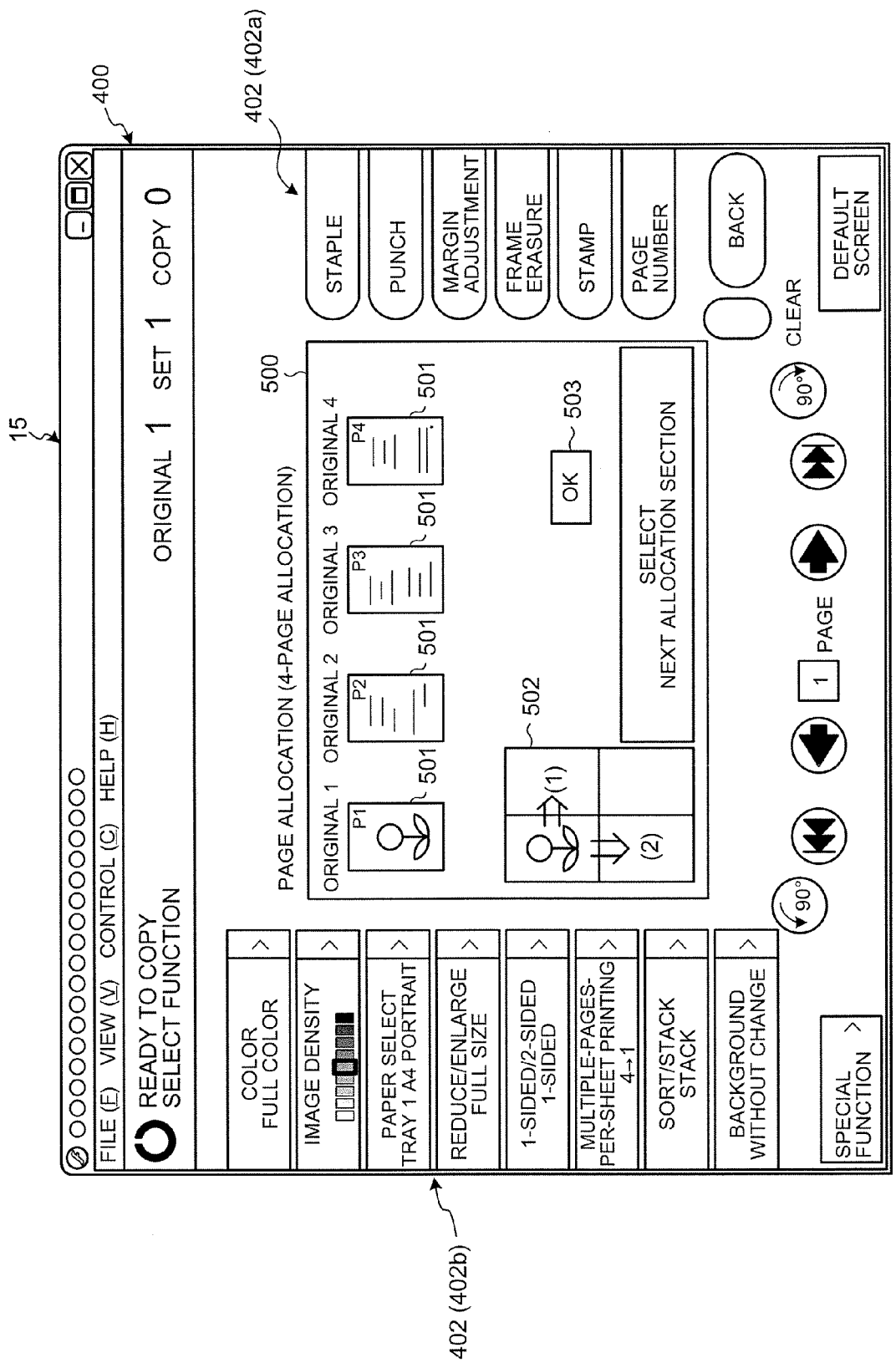
FIG. 12 is a schematic diagram of a screen used to allocate images into a single sheet according to a third modification of the first embodiment.

FIG. 12 is a schematic diagram of the input screen 400 according to a third modification of the first embodiment. As shown in FIG. 12, the input screen 400 displays the page allocation window 500. The page allocation window 500 includes the original images 501, in the number same as the number of pages to be printed in a sheet, and the page allocation sheet 502. One or more candidate original images 501, to be allocated to each section of the page allocation sheet 502, are assigned to the page allocation sheet 502 in advance. The user can select which section of the page allocation sheet 502 is to be allocated with the next original image 501 by touching the section to which the candidate original image 501 is allocated. This arrangement offers the user with an alternative as to which of the original images 501 is allocated to which section of the page allocation sheet 502, navigating the setting operation performed by the user.

A second embodiment of the present invention is explained with reference to FIGS. 13 to 15. The same components as in the first embodiment are provided with the same reference numbers, and the explanations thereof are omitted herein.

In the first embodiment, when the multiple-pages-per-sheet printing 407 is selected by a user touching it (YES at the step S3 and YES at the step S4), the page allocation window 500, shown in FIG. 7, is sent to the operation displaying unit 15 and displayed thereon (the step S5), and the images are allocated (the step S6). In this case, only one type of the page allocation sheet 502 is displayed in the page allocation window 500. On the contrary, according to the second embodiment, the user can select the page allocation sheet 502 from a plurality of templates thereof.

Figure 13:
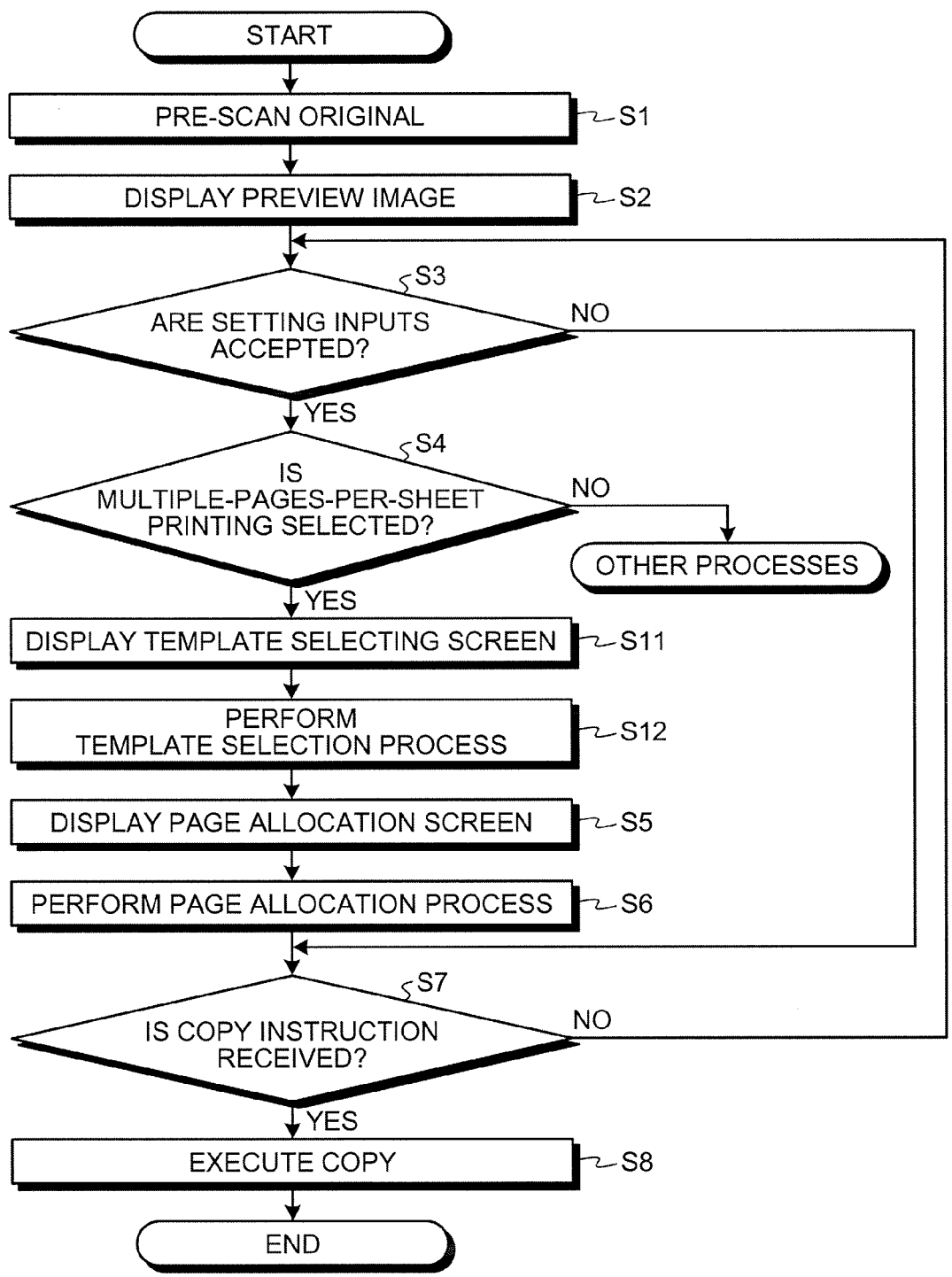
FIG. 13 is a flowchart of a preview image displaying process according to a second embodiment of the present invention, executed when multiple-pages-per-sheet printing is selected.
Figure 14:
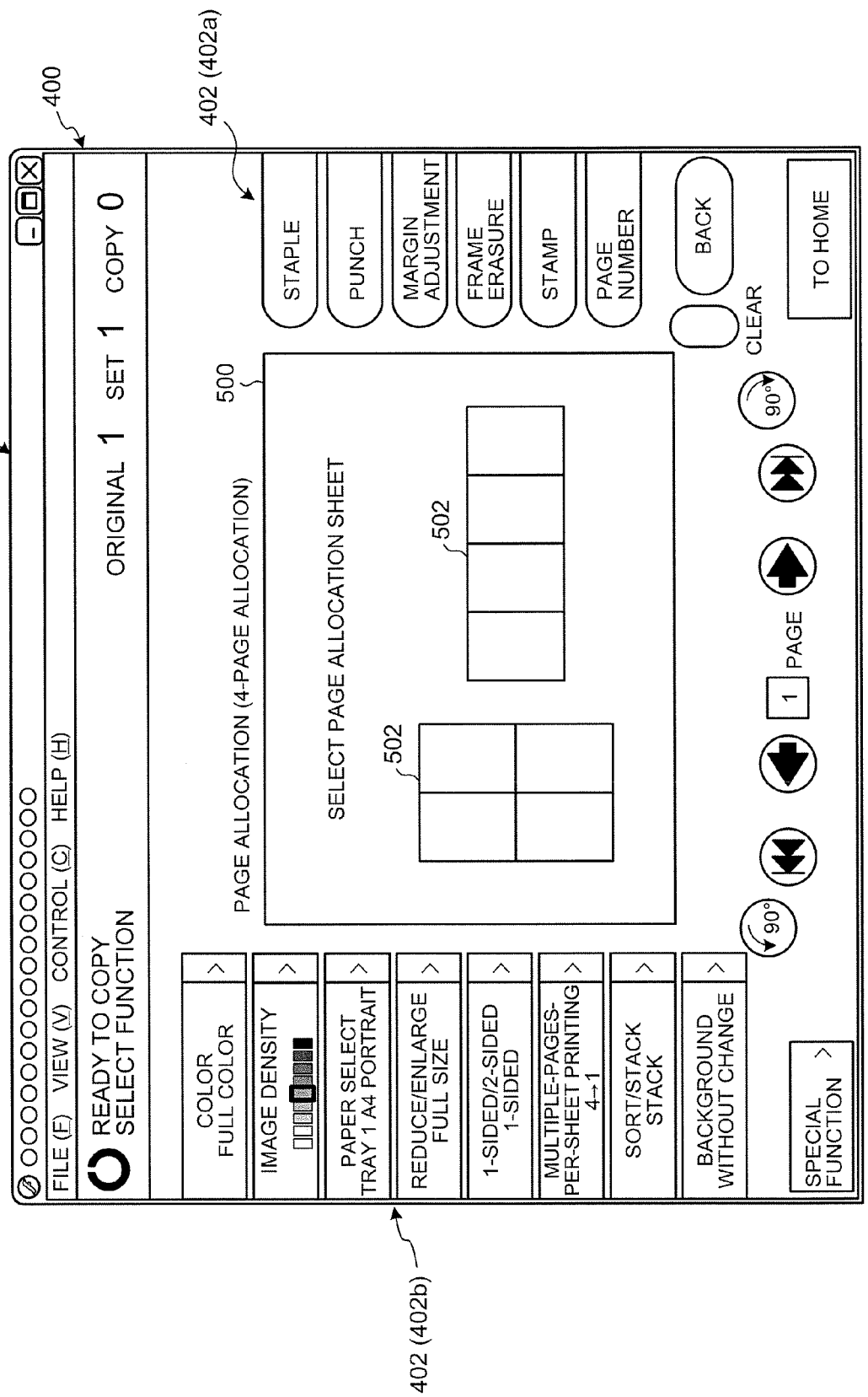
FIG. 14 is a schematic diagram of a screen used to allocate images into a single sheet according to the second embodiment.

FIG. 13 is a flowchart of a preview image displaying process performed when the user selects the multiple-pages-per-sheet printing according to the second embodiment. As shown in FIG. 13, in the second embodiment, when the multiple-pages-per-sheet printing 407 is selected by the user touching the corresponding menu item (YES at the step S3 and YES at the step S4), the system controlling unit 16 sends the input screen 400 including the page allocation window 500 displaying multiple templates for the page allocation sheet 502, as shown in FIG. 14, to the operation displaying unit 15. In response, the operation displaying unit 15 displays the received input screen 400 (step S1). The user is then prompted to select one of the templates of the page allocation sheet 502 via the input screen 400 (step S12). In this manner, the input screen 400 functions as a selecting unit.

When the user selects one of the templates of the page allocation sheet 502, the system controlling unit 16 sends the input screen 400, including the page allocation window 500, based on the selected template (for example, one shown in FIG. 7), to the operation displaying unit 15. In response, the operation displaying unit 15 displays the input screen 400 (step S5). Subsequently, the page allocation process is performed (step S6).

According to the second embodiment, multiple templates of the page allocation sheet 502 are prepared, so that a number of allocation layouts can be used.

Figure 15:
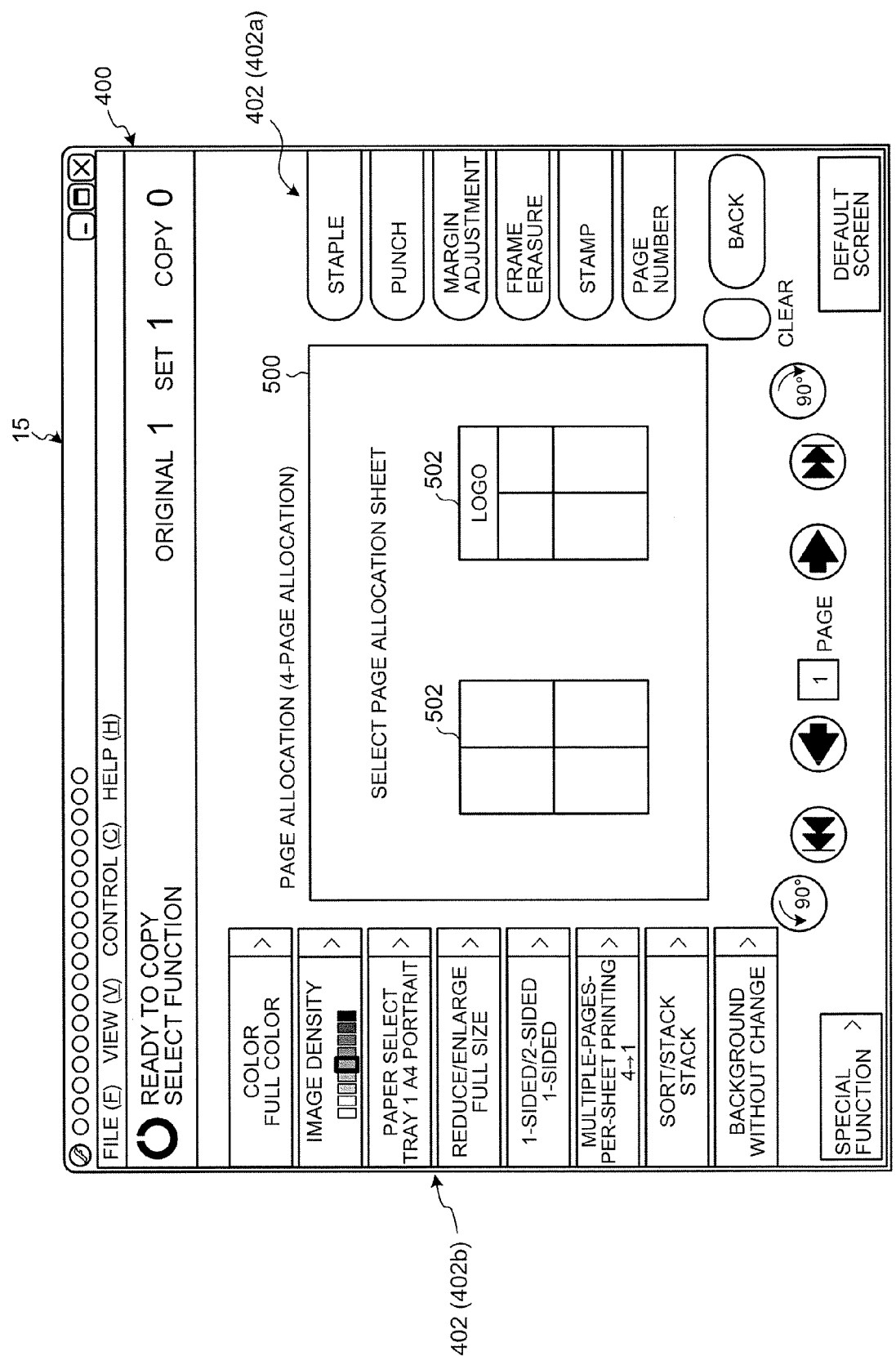
FIG. 15 is a schematic diagram of another screen used to allocate images into a single sheet according to the second embodiment.

The sections of the page allocation sheet 502 do not necessarily have the same shapes, but also can be different in shape as one shown in FIG. 15. This allows the original images 501 to be allocated, for example, while avoiding a particular part of a sheet on which a logo is put. This also enables five or six pages to be printed in a sheet.

A third embodiment of the present invention is explained with reference to FIGS. 16 to 20. The same components as in the first and the second embodiments are provided with the same reference numbers, and the explanations thereof are omitted herein.

In the first and the second embodiments, the MFP 10 is used as the image processing apparatus, however, the image processing apparatus is not limited to an MFP. For example, an image processing apparatus, such as a printer, can be connected to a personal computer (PC), and predetermined computer programs can be installed to a storage device, such as a hard disk drive (HDD), of the PC. A CPU of the PC is operated following the computer programs installed thereto to achieve the same various advantages as those described above.

Figure 16:
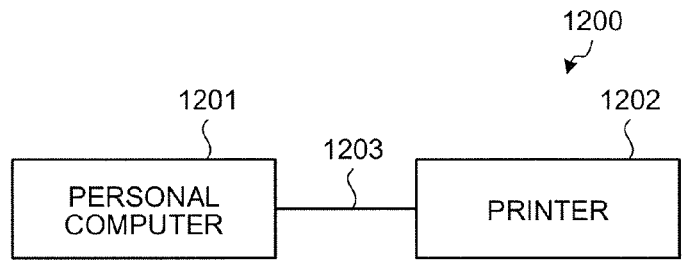
FIG. 16 is a block diagram of a schematic structure of a printing system according to a third embodiment of the present invention.

FIG. 16 is a block diagram of a schematic structure of a printing system 1200 according to the third embodiment. The printing system 1200 shown in FIG. 16 includes a PC 1201 and a printer 1202, each of which is connected via a cable 1203. The PC 1201 sends out a print job, including print data and print conditions for printing the print data to the printer 1202. The printer 1202 prints out the print data.

As mentioned above, the PC 1201 sends print data and a print condition data as a print job to the printer 1202. The print data corresponds to a document created in the PC 1201. The print condition data is set for printing out the document, and examples of such conditions include orientation of a printing paper, double-sided printing, multiple-pages-per-sheet printing, binding, stapling, punching, or enlargement/reduction of the image size.

The printer 1202 performs a printing operation based on the print job sent from the PC 1201. Specifically, the printer 1202 prints out the print data, contained in the print job, onto a medium such as a paper, based on the print condition data also contained in the print job.

Specific structures of the PC 1201 and the printer 1202 are explained in the order.

Figure 17:
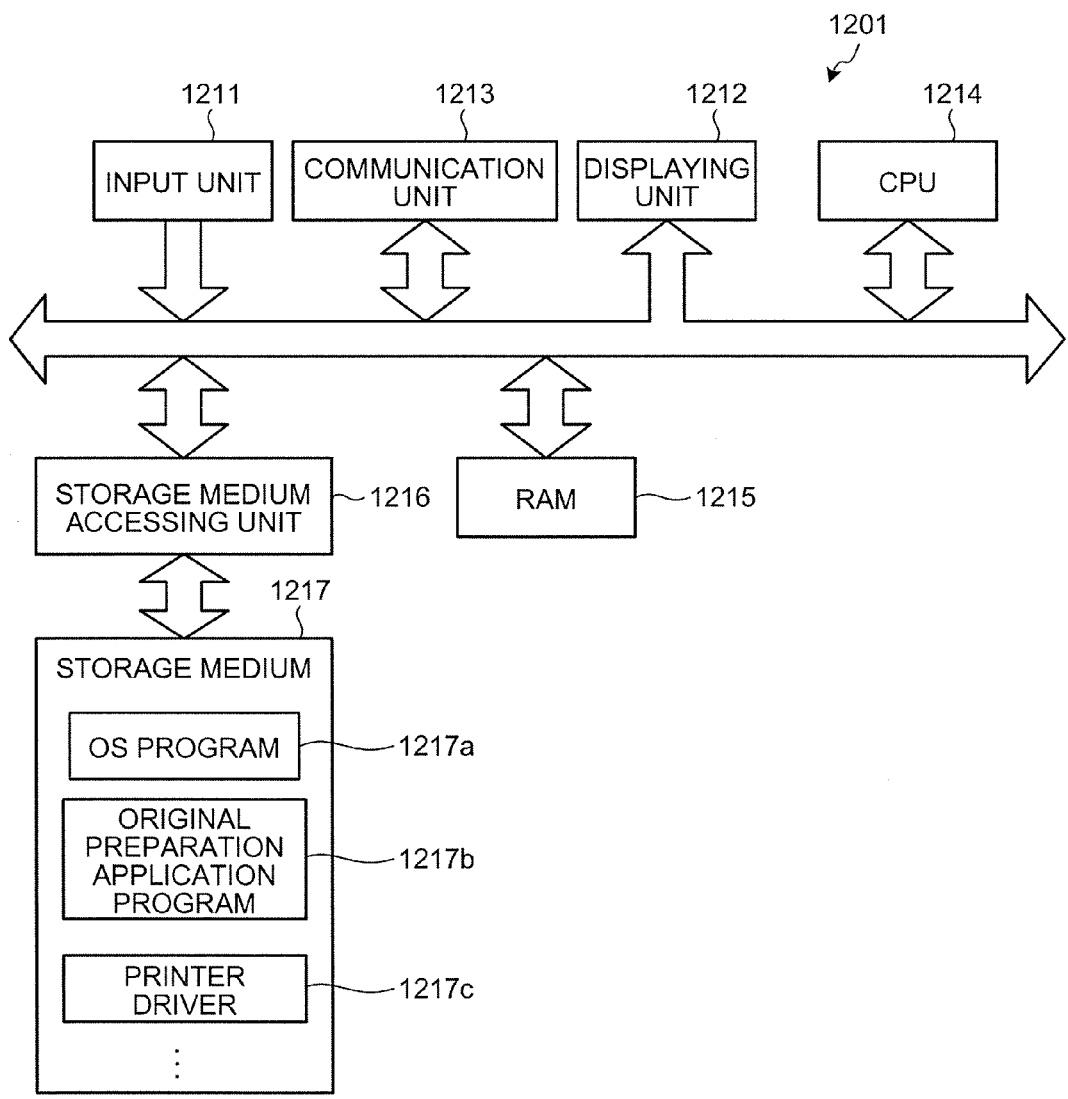
FIG. 17 is a block diagram of a schematic structure of a personal computer shown in FIG. 16.

FIG. 17 is a block diagram of a schematic structure of the PC 1201. In FIG. 17, the PC 1201 includes: an input unit 1211 for inputting data; a displaying unit 1212; a communication unit 1213 for data communication; a CPU 1214 that controls the entire system; a RAM 1215 that is used as a working area for the CPU 1214; a storage medium accessing unit 1216 that performs read/write operations to a storage medium 1217; and the storage medium 1217 that stores therein various computer programs that causes the CPU 1214 to operate.

The input unit 1211 is a user interface that allows a user to provide the CPU 1214 with instructions for operations, or to input data. The input unit 1211 includes a keyboard including cursor keys, numeric keys, and other various keys, a mouse or a touchpad for selecting the keys or the like on the display screen of the displaying unit 1212, and the like.

The displaying unit 1212 includes a cathode ray tube (CRT) or a liquid crystal display (LCD), and provides the user with a screen that is displayed based on the display data received from the CPU 1214. The communication unit 1213 is provided to exchange data externally, for example, to exchange data with the printer 1202 via the cable 1203.

The CPU 1214 is a central control unit that controls the entire system based on computer programs stored in the storage medium 1217. The CPU 1214 is connected to the input unit 1211, the displaying unit 1212, the communication unit 1213, the RAM 1215, and the storage medium accessing unit 1216. The CPU 1214 controls data communication, read of application programs by accessing a memory, read and write various data, input of data/commands, display, and the like. The CPU 1214 also receives print data and print condition data associated thereto from the input unit 1211, and transfers the print data and the print condition data to the printer 1202 as a print job via the communication unit 1213.

The RAM 1215 includes a working memory and a display memory. The working memory stores therein specified computer programs, input instructions, input data, processed results, or the like. The display memory temporarily stores therein display data to be displayed on the display screen of the displaying unit 1212.

The storage medium 1217 stores therein various computer programs and data. Examples of computer programs stored in the storage medium 1217 include those executable by the CPU 1214, such as an operation system (OS) program 1217*a* (for example, Windows (registered trademark)), a document preparation application program 1217*b*, and a printer driver 1217*c* that is compatible with the printer 1202. The storage medium 1217 includes various optical, magnetic, or electrical storage media, such as a flexible disk, a hard disk, a CD-ROM, a DVD-ROM, a magnetic optical disk (MO), and a PC card. Various computer programs are stored in the storage medium 1217 in a data format readable by the CPU 1214. The various computer programs can be stored in the storage medium in advance, or downloaded over a communication circuit to be stored in the storage medium. The various computer programs can be also distributed over a communication circuit.

Figure 18:
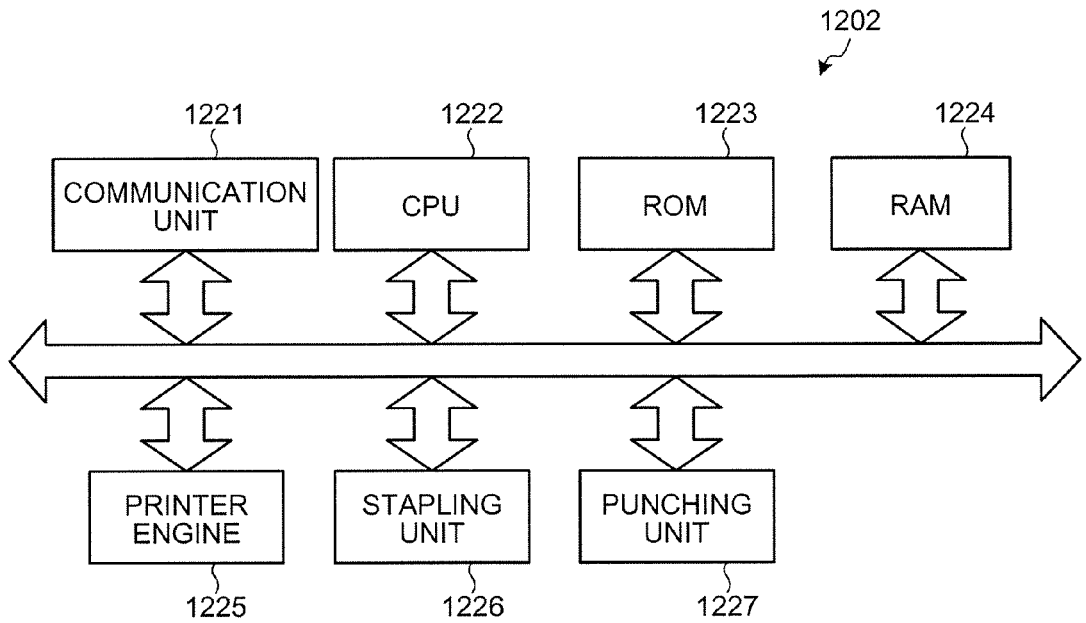
FIG. 18 is a block diagram of a schematic structure of a printer shown in FIG. 16.

FIG. 18 is a block diagram of a schematic structure of the printer 1202. As shown in FIG. 18, the printer 1202 includes: a communication unit 1221 for data communication; a CPU 1222 that controls the entire printer 1202; a ROM 1223 that stores therein various control programs to cause the CPU 1222 to operate; a RAM 1224 that acts as a working area for the various control programs and temporarily stores therein the print data and the print condition data received as a print job from the PC 1201 or the like; a printer engine 1225 for printing the print data onto a printing paper; a stapling unit 1226 for stapling the paper sheets printed with the print data; and a punching unit 1227 for punching holes onto the printing paper(s) printed with the print data. In other words, the printer 1202 includes the double-sided printing function, the punching function, and the stapling function.

The communication unit 1221 performs data communication externally, for example, with the PC 1201.

The CPU 1222 is a central processing unit that controls the entire system based on computer programs stored in the ROM 1223. The CPU 1222 is connected to the communication unit 1221, the ROM 1223, the RAM 1224, the printer engine 1225, the stapling unit 1226, and the punching unit 1227, and controls data communications, operations of the printer, and the like.

The ROM 1223 stores therein various control programs to cause the CPU 1222 to operate, and parameters used for the processes in the controls programs. The RAM 1224 includes a working memory that stores therein specified control programs, process results, received print data, and the like.

The printer engine 1225 includes an electrophotographic printer engine, and prints print data onto a printing paper. The printer 1202 can use any printing method in addition to the electrophotographic printing, such as ink-jet printing, sublimation dye thermal transfer, silver halide photographic, direct thermosensitive recording, or thermal wax transfer.

The printer driver 1217*c* installed in the PC 1201 is explained. The printer driver 1217*c* is a software program that controls the printer 1202, and performs operations such as processing output data. The printer driver 1217*c* is designed so that computer programs, with respect to a specific program, can be operated independently from hardware or internal "language" of the printer 1202.

Under the controls of the printer driver 1217, the CPU 1214 in the PC 1201 generates and displays the end result information (preview image) based on the print data and the print condition data associated thereto input via the input unit 1211. The CPU 1214 then transfers the print data, created with the document preparation application program 1217*b*, to the printer 1202.

Figure 19:
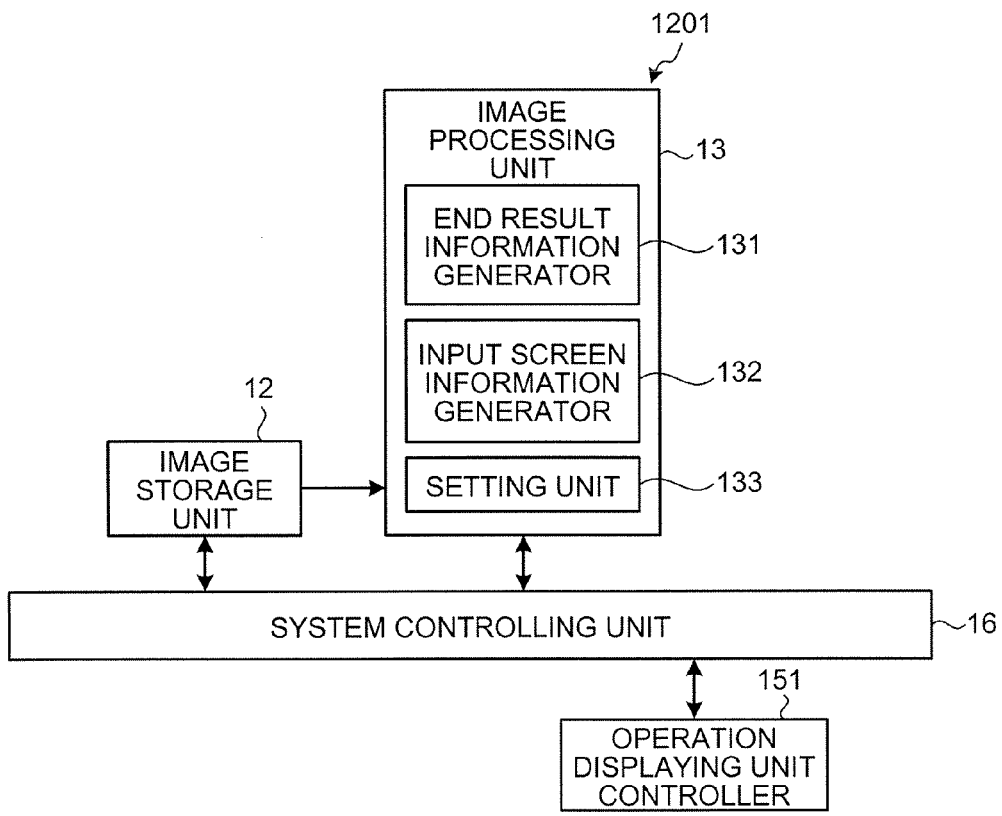
FIG. 19 is a block diagram of a relevant portion of the personal computer shown in FIG. 17.

As shown in FIG. 19, the image storage unit 12, the image processing unit 13, the operation displaying unit controller 151, and the system controlling unit 16 are implemented in the PC 1201, by operating the CPU 1214 under the control of the printer driver 1217*c*.

In this manner, because the CPU 1214 operates under the control of the printer driver 1217*c*, the system configuration of the PC 1201 becomes equivalent to that of the MFP 10 shown in FIG. 1. Therefore, those various advantages explained for the first and the second embodiments can be also achieved in the third embodiment.

Figure 20:
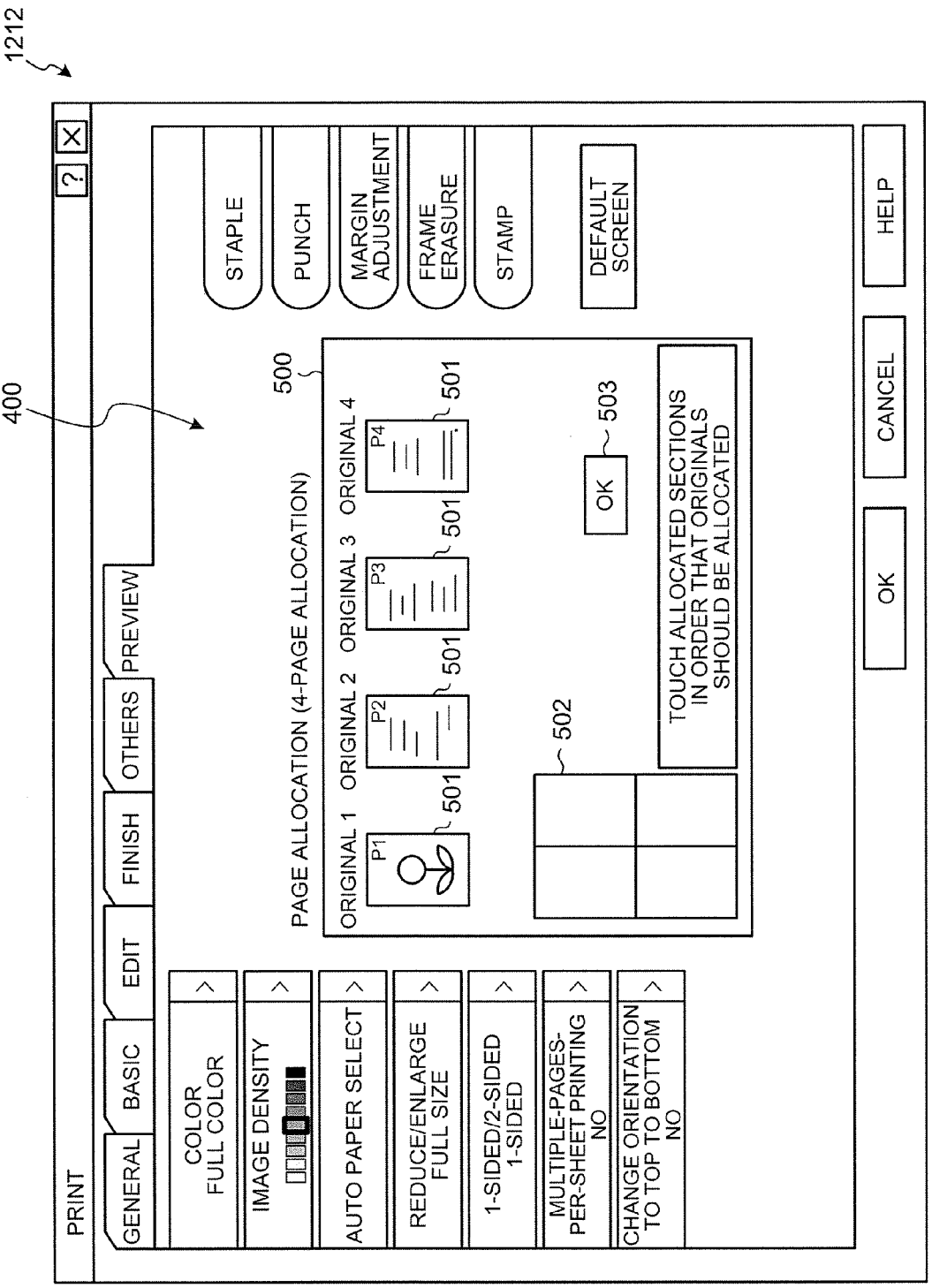
FIG. 20 is a schematic diagram of an exemplary display screen presented by a printer driver according to the third embodiment.

FIG. 20 is a schematic diagram of an exemplary display screen presented by the printer driver 1217*c*. The screen shown in FIG. 20 is displayed when the printer driver 1217*c* is started, for example, on the screen of the document preparation application program 1217*b* or the startup screen of the OS program 1217*a*. In the screen shown in FIG. 20, the input screen 400 (the same screen as the input screen 400 displayed on the MFP 10) can be selected from a plurality of screens including a basic condition setting screen, an editing condition setting screen, a finishing condition setting screen, and the like. In the input screen 400, a preview image can be generated and displayed based on the print data and the print condition data associated thereto input via the input unit 1211.

According to the third embodiment, by causing the CPU 1214 in the PC 1201 to operate under the control of the printer driver 1217*c*, the input screen 400 is displayed. In the input screen 400, the expected end result is generated and displayed based on the print data and the print condition data associated thereto input via the input unit 1211. However, the input screen 400 can also be displayed, without limitation, by causing the CPU 1214 in the PC 1201 to operate under the control of the document preparation application program 1217*b* or the OS program 1217*a*.

According to an aspect of the present invention, when the multiple-pages-per-sheet printing is selected, the user can specify how the images are allocated into a single sheet on the preview image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for generating a preview image, said apparatus comprising:
    a processor that includes a first screen displaying unit that displays a first screen, and wherein the first screen includes a plurality of setting items for receiving a setting of process on each image data of a plurality of pages, and wherein the first screen includes a first preview image generated based on an image data of one page among the plurality of pages and the setting of process;
    a first receiving unit that receives an input on at least one of the setting items displayed in the first screen by the first screen displaying unit;
    a second screen displaying unit that changes the first screen to a second screen which displays the image data of the plurality of pages and one multiple-pages-per-sheet page, when the first receiving unit has received an input for setting multiple-pages-per-sheet printing;
    a second receiving unit that receives an input for selecting a specified image datum among the image data displayed in the second screen by the second displaying unit;
    a third screen displaying unit that changes the second screen to the third screen which displays the image data of the plurality of pages and a second preview image of a multiple-pages-per-sheet page in which the image datum received by the second receiving unit is allocated;
    a third receiving unit that receives a confirmation of selection of multiple-pages-per-sheet printing; and
    a fourth screen displaying unit that changes the third screen to a fourth screen which displays a third preview image of a multiple-pages-per-sheet page which is formed based on the setting and the second preview image displayed by the third screen displaying unit, when the third receiving unit has received the confirmation.

2. The image processing apparatus according to claim 1, wherein the image data is allocated to the second preview image, in order of pages, to sections of the second preview image, starting from a section specified first.

3. The image processing apparatus according to claim 2, further comprising a storage unit, and wherein a number is pre-assigned to each section of the second preview image, and the image data is allocated to the sections having the pre-assigned numbers corresponding to an order in which the image data is specified.

4. The image processing apparatus according to claim 2, wherein by specifying one of the image datum first and one of the sections of the second preview image subsequently, the image specified first is allocated to the subsequently-specified section of the second preview image.

5. The image processing apparatus according to claim 1, wherein a plurality of options are displayed, and one or more of the image data representing candidates to be allocated are displayed, and selection of the next order of allocation is enabled by specifying candidates, from among the plurality of displayed options.

6. The image processing apparatus according to claim 1, further including a selecting unit that allows a user to select one of a plurality of page allocation sheets,
    wherein a page allocation window is displayed, the page allocation window including the image data and a selected page allocation sheet to which image data is allocated.

7. The image processing apparatus according to claim 1, wherein second preview image includes at least one section that has a shape different from others.

8. The apparatus of claim 1, wherein the apparatus is selected from the group comprising a multi-function peripheral and a personal computer.

9. A computer program product comprising a non-transitory computer storage medium having computer readable program codes embodied in the medium that, when executed, causes an image processing apparatus to execute:
    a first screen displaying step of displaying a first screen, wherein the first screen includes a plurality of setting items for receiving a setting of process on each image data of a plurality of pages, and wherein the first screen includes a first preview image generated based on an image data of one page among the plurality of pages and the setting of process;
    a first receiving step of receiving an input on at least one of the setting items displayed in the first screen during the first screen displaying step;
    a second screen displaying step of changing the first screen to a second screen which displays the image data of the plurality of pages and one multiple-pages-per-sheet page, when an input for setting multiple-pages-per-sheet printing has been received, during the first receiving step;
    a second receiving step of receiving an input for selecting a specified image datum among the image data displayed in the second screen during the second displaying step;
    a third screen displaying step of changing the second screen to the third screen which displays the image data of the plurality of pages and a second preview image of a multiple-pages-per-sheet page in which the image datum received during the second receiving step is allocated;
    a third receiving step of receiving a confirmation of selection of multiple-pages-per-sheet printing; and
    a fourth screen displaying step of changing the third screen to a fourth screen which displays a third preview image of a multiple-pages-per-sheet page which is formed based on the setting and the second preview image displayed during the third screen displaying step, when the confirmation has been received, during the third receiving step.

10. The product of claim 9, wherein the image data is allocated to the second preview image, in order of pages, to sections of the second preview image, starting from a section specified first.

11. The product of claim 9, wherein a number is pre-assigned to each section of the second preview image, and the image data is allocated to the sections having the pre-assigned number corresponding to an order in which the image data is specified.

12. The product of claim 9, wherein by specifying one of the image datum first and one of a plurality of sections of the second preview image subsequently, the image datum specified first is allocated to a subsequently-specified section of the second preview image.

13. The product of claim 9, wherein a plurality of options are displayed, and one or more of the image data representing candidates to be allocated are displayed, and selection of the next order of allocation is enabled by specifying candidates, from among the plurality of displayed options.

14. A preview image displaying method comprising:
   a first screen displaying step of displaying a first screen, wherein the first screen includes a plurality of setting items for receiving a setting of process on each image data of a plurality of pages, and wherein the first screen includes a first preview image generated based on an image data of one page among the plurality of pages and the setting of process;
   a first receiving step of receiving an input on at least one of the setting items displayed in the first screen during the first screen displaying step;
   a second screen displaying step of changing the first screen to a second screen which displays the image data of the plurality of pages and one multiple-pages-per-sheet page, when an input for setting multiple-pages-per-sheet printing has been received, during the first receiving step;
   a second receiving step of receiving an input for selecting a specified image datum among the image data displayed in the second screen during the second displaying step;
   a third screen displaying step that changes the second screen to the third screen which displays the image data of the plurality of pages and a second preview image of a multiple-pages-per-sheet page in which the image datum received during the second receiving step is allocated;
   a third receiving step of receiving a confirmation of selection of the multiple-pages-per-sheet printing; and
   a fourth screen displaying step of changing the third screen to a fourth screen which displays a third preview image of a multiple-pages-per-sheet page which is formed based on the setting and the second preview image displayed during the third screen displaying step, when the confirmation has been received, during the third receiving step.

15. The method of claim 14, wherein a user selects one of a plurality of page allocation sheets, and wherein a screen displaying unit displays input screen information having a page allocation window, the page allocation window including the image data and a selected page allocation sheet to which the image data is allocated.

16. The method of claim 14, wherein sections of the second preview image include at least one section that has a shape different from others.

17. The method of claim 14, wherein the image data is allocated to the second preview image, in order of pages, to sections of the second preview image, starting from a section specified first.

18. The method of claim 14, wherein a number is pre-assigned to each section of the second preview image, and images are allocated to the sections having the pre-assigned number corresponding to an order in which the image data is specified.

19. The method of claim 14, wherein by specifying one of the image datum first and one of a plurality of sections of the second preview image subsequently, the image datum specified first is allocated to a subsequently-specified section of the second preview image.

20. The method of claim 14, wherein a plurality of options are displayed, and one or more of the image data representing candidates to be allocated are displayed, and selection of the next order of allocation is enabled by specifying candidates, from among the plurality of displayed options.

* * * * *